United States Patent
Sanji et al.

(10) Patent No.: US 12,269,480 B2
(45) Date of Patent: Apr. 8, 2025

(54) VEHICULAR POSITION ESTIMATION SYSTEM

(71) Applicant: DENSO CORPORATION, Kariya (JP)

(72) Inventors: Kenichiro Sanji, Nisshin (JP); Youhei Sekiya, Nisshin (JP); Takashi Shinoda, Kariya (JP); Kazuhiro Nakashima, Kariya (JP)

(73) Assignee: DENSO CORPORATION, Kariya (JP)

( * ) Notice: Subject to any disclaimer, the term of this patent is extended or adjusted under 35 U.S.C. 154(b) by 723 days.

(21) Appl. No.: 17/387,227

(22) Filed: Jul. 28, 2021

(65) Prior Publication Data

US 2021/0356555 A1 Nov. 18, 2021

Related U.S. Application Data

(63) Continuation of application No. PCT/JP2020/000222, filed on Jan. 8, 2020.

(30) Foreign Application Priority Data

Jan. 31, 2019 (JP) .................. 2019-015240

(51) Int. Cl.
*B60W 40/08* (2012.01)
*G01S 5/14* (2006.01)

(52) U.S. Cl.
CPC ....... *B60W 40/08* (2013.01); *B60W 2540/227* (2020.02); *G01S 5/14* (2013.01)

(58) Field of Classification Search
CPC ... B60W 40/08; B60W 2540/227; G01S 5/14; G01S 13/878; G01S 13/765; B60R 25/24; E05B 49/00
See application file for complete search history.

(56) References Cited

U.S. PATENT DOCUMENTS 7,734,061 B2 * 6/2010 Breed ................ G01S 15/88
    348/47
9,363,776 B2 * 6/2016 Gupta ................ H04W 56/002
(Continued)

FOREIGN PATENT DOCUMENTS

DE  102016207110 A1  11/2017
DE  102016213689 A1  2/2018
(Continued)

OTHER PUBLICATIONS

"Shchekotov, M et al.; Semi-Automatic Self-Calibrating Indoor Localization Using BLE Beacon Multilateration; 2018; Proceeding of the 23rd Conference of Fruct Association" (Year: 2018).*
(Continued)

*Primary Examiner* — Elaine Gort
*Assistant Examiner* — Christopher R Cardimino
(74) *Attorney, Agent, or Firm* — Harness, Dickey & Pierce, P.L.C.

(57) ABSTRACT

A vehicular position estimation system determines a portable terminal position by causing multiple in-vehicle communication devices placed at different positions on a vehicle to wirelessly communicate with a potable terminal, and includes: a distance index value acquisition portion that acquires a distance index value indicating a distance between the multiple in-vehicle communication devices; a normal range storage portion that stores data indicating a normal range of the distance index value; and a communication device diagnosis portion that determines whether the in-vehicle communication device is normal. When the distance index value between a diagnosis target device and at least one different device is in a normal range, the communication device diagnosis portion determines that a failure does not occur in the diagnosis target device.

9 Claims, 12 Drawing Sheets

(56) References Cited

U.S. PATENT DOCUMENTS

| | | | | |
|---|---|---|---|---|
| 9,964,953 B2* | 5/2018 | Taira | ................. | G05D 1/024 |
| 10,000,187 B2* | 6/2018 | Hamada | ................. | G01S 5/012 |
| 10,339,731 B2* | 7/2019 | Kumabe | ................. | H04W 4/80 |
| 10,802,104 B2* | 10/2020 | Ylamurto | ................. | G01S 5/14 |
| 11,388,556 B2* | 7/2022 | Sanji | ................. | H04W 4/40 |
| 2012/0176272 A1 | 7/2012 | Hirata et al. | | |
| 2017/0318423 A1* | 11/2017 | Reisinger | ................. | H04W 12/08 |
| 2017/0345231 A1* | 11/2017 | Kumabe | ................. | H04W 88/02 |
| 2018/0035433 A1 | 2/2018 | Zielinski et al. | | |
| 2018/0213355 A1* | 7/2018 | Smith | ................. | G01S 13/765 |
| 2021/0078535 A1* | 3/2021 | Salah | ................. | B60R 25/24 |

FOREIGN PATENT DOCUMENTS

| | | | | |
|---|---|---|---|---|
| EP | 0735383 A1 * | 10/1996 | ................. | B60Q 1/48 |
| EP | 3399328 B1 * | 1/2020 | ................. | G01S 3/46 |
| JP | 2002-325082 A | 11/2002 | | |
| JP | 2011080946 A | 4/2011 | | |
| JP | 2011179214 A * | 9/2011 | | |
| JP | 5595443 B2 * | 9/2014 | ................. | A01N 43/54 |
| JP | 6093647 B2 | 3/2017 | | |

OTHER PUBLICATIONS

"Macii, D et al.; A Data Fusion Technique for Wireless Ranging Performance Improvement; Jan. 2013; IEEE Transactions on Instrumentation and Measurement, vol. 62, No. 1" (Year: 2013).*

* cited by examiner

| COMBINATION OF COMMUNICATION DEVICES | NORMAL RANGE [NANOSECONDS] |
|---|---|
| FIRST COMBINATION (RIGHT FRONT - LEFT FRONT) | 5.0 - 6.0 |
| SECOND COMBINATION (RIGHT REAR - LEFT REAR) | 5.0 - 6.0 |
| THIRD COMBINATION (RIGHT FRONT - RIGHT REAR) | 7.1 - 8.1 |
| FOURTH COMBINATION (LEFT FRONT - LEFT REAR) | 7.1 - 8.1 |
| FIFTH COMBINATION (RIGHT FRONT - LEFT REAR) | 8.8 - 9.8 |
| SIXTH COMBINATION (LEFT FRONT - RIGHT REAR) | 8.8 - 9.8 |

VEHICULAR POSITION ESTIMATION SYSTEM

CROSS REFERENCE TO RELATED APPLICATIONS

The present application is a continuation application of International Patent Application No. PCT/JP2020/000222 filed on Jan. 8, 2020, which designated the U.S. and claims the benefit of priority from Japanese Patent Application No. 2019-015240 filed on Jan. 31, 2019. The entire disclosures of all of the above applications are incorporated herein by reference.

TECHNICAL FIELD

The present disclosure relates to a technology that estimates a relative position with respect to a vehicle of a communication device (hereinafter, portable terminal) carried by a user with use of electric waves.

BACKGROUND

A method, in which at least three reference stations of which positions are known communicate with a portable terminal such as a smartphone to specify a distance between each reference station and the portable terminal and a position of the portable terminal is estimated based on the distance information from each reference station, has been proposed. The distance from the reference station to the portable terminal is specified by, for example, multiplying a measured electric wave propagation time (in other words, flight time) by an electric wave propagation time. Positioning methods (hereinafter, propagation time methods) using the electric wave propagation time include a TOA (Time Of Arrival) method, a TDOA (Time Difference Of Arrival) method, and the like.

Further, in a comparative example, each reference station is capable of communicating with a portable terminal by UWB (Ultra-Wide Band). The reference station estimates the distance to the portable terminal based on a time (hereinafter, a round trip time) from a time of transmitting an impulse signal used for an UWB communication to a time of receiving a response signal from the portable terminal.

SUMMARY

A vehicular position estimation system determines a portable terminal position by causing multiple in-vehicle communication devices placed at different positions on a vehicle to wirelessly communicate with a potable terminal, and includes: a distance index value acquisition portion that acquires a distance index value indicating a distance between the multiple in-vehicle communication devices; a normal range storage portion that stores data indicating a normal range of the distance index value; and a communication device diagnosis portion that determines whether the in-vehicle communication device is normal. When the distance index value between a diagnosis target device and at least one different device is in a normal range, the communication device diagnosis portion determines that a failure does not occur in the diagnosis target device.

BRIEF DESCRIPTION OF DRAWINGS

The above and other features and advantages of the present disclosure will become more apparent from the following detailed description made with reference to the accompanying drawings. In the accompanying drawings.

DETAILED DESCRIPTION

Figure 1:
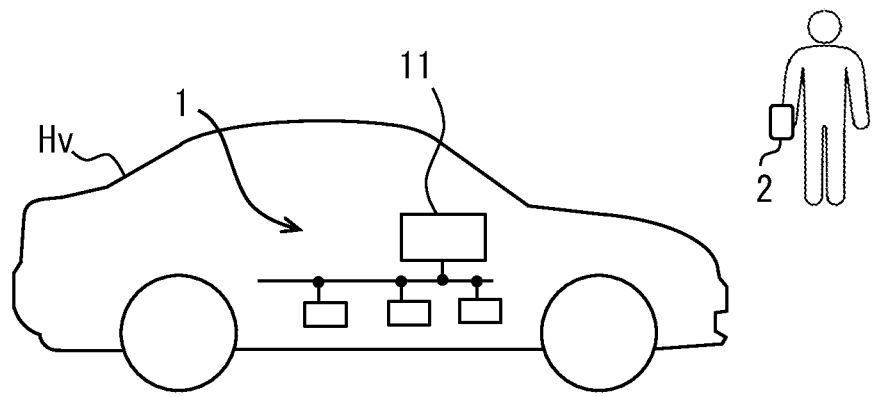
FIG. 1 is a diagram showing an overall configuration of a vehicular electronic key system.

In the propagation time method, a measurement error of the electric wave propagation time has a great influence on an estimation accuracy of the distance (or a position) from the reference station to the portable terminal. Specifically, even when the propagation time is shifted by 1 nanosecond, the estimated distance from the reference station to the portable terminal is shifted by 30 centimeters. When, due to a failure of a communication device as the reference station, the propagation time cannot be accurately measured, the estimation accuracy of the portable terminal position may deteriorate. In view of such circumstances, in the propagation time method, a configuration for determining whether the communication device as the reference station normally operates is necessary.

As a configuration for determining whether each reference station normally operates, it is possible to assume, for example, a configuration (hereinafter, assumed configuration) in which the reference stations mutually communicate with each other to sequentially specify the signal propagation time between the stations or specify the signal propagation time as needed. According to the assumed configuration, it is possible to detect that a failure occurs in the reference station based on a state where the propagation time is out of a normal range.

However, the cause of the error in the propagation time is not limited to the failure of the reference station. After repeated simulations and studies on the assumed configuration, the inventors found that the propagation time increases depending on an environment between the reference stations. That is, when the object (hereinafter, shield) such as a metal body or a human body that obstructs a straight propagation of the electric waves exist between the reference stations, the electric waves have a length in accordance with a detour route since the electric waves propagate so as to go around the shield. That is, the difference between the length of the detour route and the shortest distance appears as the error in the propagation time. In the above-described assumed configuration, even when the communication device as the reference station normally operates, the propagation time may deviate from the normal range depending on a type of the inclusion. In such a situation, it is possible to reduce the possibility of the erroneous determination by setting the normal range to the large range. However, it is not possible to detect the failure causing the minute delay such as, for example, several nanoseconds.

One example of the present disclosure provides a vehicular position estimation system. The vehicular position estimation system can detect, as a failure of an in-vehicle communication device, the failure that causes a minute delay as an observation value of the propagation time, and reduce a possibility of erroneously determining that the failure occurs in the in-vehicle communication device.

According to one example embodiment, a vehicular position estimation system determines a portable terminal position with respect to a vehicle by causing multiple in-vehicle communication devices placed at different positions on the vehicle to wirelessly communicate with a potable terminal carried by a user of the vehicle. In the vehicle position estimation system. Each of the multiple in-vehicle communication device can wirelessly communicate with at least two of multiple different devices that are mounted on the vehicle and are the multiple in-vehicle communication devices. The vehicular position estimation system includes: a distance index value acquisition portion that acquires a distance index value directly or indirectly indicating a distance between the multiple in-vehicle communication devices by causing the multiple in-vehicle communication devices to perform a wireless communication for each combination of the multiple in-vehicle communication devices having a positional relationship that enables the wireless communication with each other; a normal range storage portion that stores data indicating a normal range of the distance index value in accordance with a combination of the multiple in-vehicle communication devices; and a communication device diagnosis portion that determines whether the multiple in-vehicle communication devices are normal based on the distance index value for each combination, which is acquired by the distance index value acquisition portion, of the multiple in-vehicle communication devices. When the distance index value between a diagnosis target device to be diagnosed among the multiple in-vehicle communication devices and at least one of the multiple different devices is within the normal range in accordance with the combination of the multiple in-vehicle communication devices, the communication device diagnosis portion determines that a failure does not occur in the diagnosis target device.

The above-described communication device diagnosis portion determines that the failure does not occur in the diagnosis target device when, in at least one of all combinations including the diagnosis target device as a configuration element, the propagation time is in the normal range. In other words, the above-described communication device diagnosis portion determines that the failure occurs in the diagnosis target device when, in all combinations including the diagnosis target device as the configuration element, the propagation time is outside the normal range.

Here, a possibility that the shield intervenes between communication devices in all combinations related to the diagnosis target device is relatively low. Therefore, according to the above-described configuration, it is possible to reduce the possibility of erroneously determining that the in-vehicle communication device having no failure is the failure device due to the presence of the shield (and thus diffraction).

In addition, the above-described effect is obtained without setting the normal range to be large similarly to the assumed configuration. That is, according to the above-described configuration, it is possible to detect the failure causing the minute delay such as several nanoseconds as an observation value of the propagation time while reducing a possibility of erroneously determining that the failure occurs in the in-vehicle communication device having no failure. In addition, it is possible to specify which of the two in-vehicle communication devices constituting the combination in which the propagation time deviates from the normal range is observed has a failure.

[Embodiment]

Hereinafter, as one example of an embodiment of a vehicular position estimation system of the present disclosure, a vehicular electronic key system to which the vehicular position estimation system is applied will be described with reference to the drawings. As shown in FIG. 1, the vehicular electronic key system according to the present disclosure includes an in-vehicle system 1 mounted on a vehicle Hv and a portable terminal 2 that is a communication terminal carried by a user of the vehicle Hv.

<Overview>

The in-vehicle system 1 and the portable terminal 2 can execute an UWB (Ultra Wide Band-Impulse Radio) type wireless communication (hereinafter, UWB communication). That is, the in-vehicle system 1 and the portable terminal 2 can transmit and receive impulse-shaped electric waves (hereinafter, impulse signals) used in UWB communication. The impulse signals used in the UWB communication has a pulse width of an extremely short time (for example, 2 nanoseconds) and has a bandwidth of 500 MHz or more (that is, an ultra wide bandwidth).

Frequency bands that can be used in the UWB communication (hereinbelow, the UWB band) include 3.2 GHz to 10.6 GHz, 3.4 GHz to 4.8 GHz, 7.25 GHz to 10.6 GHz, 22 GHz to 29 GHz, and the like. Among these various frequency bands, the impulse signal in the present embodiment is implemented using electric waves in the band of 3.1 GHz to 10.6 GHz. The frequency band used for the impulse signal may be selected in accordance with the country in which the vehicle Hv is used. It is only required that the bandwidths of the impulse signals are 500 MHz or more, and the impulse signals may have bandwidths of 1.5 GHz or more.

As a modulation method for the UWB-IR communication, various methods such as a PPM (pulse position modulation) method for modulating at a pulse generation position can be adopted. Specifically, an OOK (On Off keying) method, a PWM (Pulse Width Modulation) method, a PAM (Pulse-Amplitude Modulation) method, a PCM (Pulse-Code Modulation), and the like can be used. The on-off keying method is a method of expressing information (for example, 0 and 1) by the presence or absence of an impulse signal, and the pulse width modulation method is a method of expressing information by a pulse width. The pulse-amplitude modulation method is a method of expressing information by the amplitude of an impulse signal. The pulse-code modulation method is a method of expressing information by combining pulses.

Further, the in-vehicle system 1 and the portable terminal 2 of the present embodiment can execute a wireless communication (hereinafter, BLE communication) compliant with a Bluetooth Low Energy standard (Bluetooth is a registered trademark) as a second communication method. A first communication method refers to the above-described UWB communication. As the second communication method, in addition to the Bluetooth Low Energy, various short distance wireless communication methods such as, for example, a Wi-Fi (registered trademark) and ZigBee (registered trademark) can be used. In the short distance wireless communication method, a communication distance can be set to about 10 meters. The second communication method may be any one that can provide a communication distance of, for example, several meters to several tens of meters. Hereinafter, in order to distinguish the UWB communication signal from the BLE communication signal, the wireless signal compliant with the BLE standard is also referred to a BLE signal. Hereinafter, the specific configurations of the in-vehicle system 1 and the portable terminal 2 will be described in order.

<Configuration of Portable Terminal>

First, the configuration and the operations of the portable terminal 2 will be described. The portable terminal 2 is associated with the in-vehicle system 1, and is a device that functions as an electronic key of the vehicle Hv. The portable terminal 2 can be implemented using a communication terminal which is applied to various purposes. For example, the portable terminal 2 is a smartphone. The portable terminal 2 may be an information process terminal such as a tablet terminal. Further, the portable terminal 2 may be a rectangular, elliptical (fob type), or card type small device conventionally known as a smart key. In addition, the portable terminal 2 may be configured as a wearable device worn on a finger, arm, or the like of a user.

Figure 2:
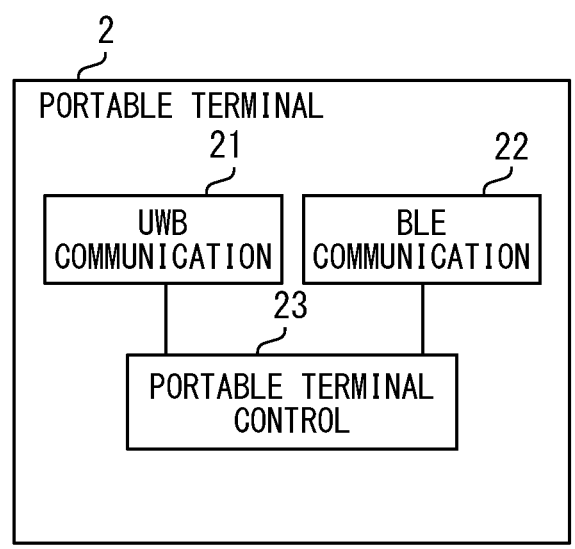
FIG. 2 is a functional block diagram for describing a configuration of a portable terminal.

As shown in FIG. 2, the portable terminal 2 includes an UWB communication portion 21, a BLE communication portion 22, and a portable terminal controller 23. The portable terminal controller 23 is connected to each of the UWB communication portion 21 and the BLE communication portion 22 so as to communicate with each other.

The UWB communication portion 21 is a communication module for transmitting and receiving the impulse signal of the UWB. The UWB communication portion 21 generates a modulation signal while electrically processing a baseband signal input from the portable terminal controller 23 such as modulating the baseband signal, and transmits this modulation signal by the UWB communication. The modulation signal is a signal obtained by modulating transmission data by a predetermined modulation method (for example, PCM modulation method). The modulated signal is a signal sequence (hereinafter, pulse sequence signal) in which multiple impulse signals are arranged at time intervals corresponding to the transmission data. Further, when receiving the series of modulation signals (that is, pulse sequence signal) composed of multiple impulse signals transmitted from the in-vehicle system 1, the UWB communication portion 21 demodulates the reception signal and restores data before modulation. Then, the reception data is output to the portable terminal controller 23.

Further, the UWB communication portion 21 includes, as an operation mode, a reflection response mode and a normal mode. When the UWB communication portion 21 in the reflection response mode receives the impulse signal, the UWB communication portion 21 returns the impulse signal reflexively (in other words, immediately or as soon as possible). Whether to operate in the reflection response mode is switched by the portable terminal controller 23 based on, for example, an instruction signal from the in-vehicle system 1. It takes a predetermined time (hereinafter, response processing time Tb) from the reception of the impulse signal from the in-vehicle system 1 to the transmission of the impulse signal as the response signal by the portable terminal 2. The response processing time Tb is determined in accordance with a hardware configuration of the portable terminal 2. An assumed value of the response processing time Tb can be specified in advance by a test or the like.

The normal mode is a mode in which a series of pulse sequence signals from the preamble to the end are received and a response signal in accordance with the content of reception data is returned. The portable terminal 2 in the reflection response mode may generate the response signal of the content of the reception data and return the response signal after reflexively returning the series of impulse signals similarly to the pulse sequence signal transmitted from the in-vehicle system 1.

The BLE communication portion 22 is a communication module for executing the BLE communication. The BLE communication portion 22 is connected to the portable terminal controller 23 so as to communicate with each other. The BLE communication portion 22 receives the BLE signal transmitted from the vehicle Hv and provides the BLE signal to the portable terminal controller 23, and modulates data input from the portable terminal controller 23 and transmits the data to the vehicle Hv.

The portable terminal controller 23 controls the operation of the UWB communication portion 21 or the BLE communication portion 22. The portable terminal controller 23 is implemented using, for example, a computer provided with a CPU, a RAM, and a ROM.

The portable terminal controller 23 wirelessly transmits a wireless signal including transmission source information to the BLE communication portion 22 at predetermined transmission intervals. Thereby, the portable terminal controller notifies the in-vehicle system 1 and the like of the own existence (that is, advertises the own existence). Hereinafter, for convenience, the wireless signal periodically transmitted for advertising is referred to as an advertisement signal. The transmission source information is, for example, unique identification information (hereinafter, referred to as a terminal ID) preliminarily assigned to the portable terminal 2. The terminal ID functions as information for identifying the portable terminal 2 from another communication terminal. The in-vehicle system 1 recognizes that the portable terminal 2 exists within the BLE communication range of the vehicle Hv by receiving this advertisement signal. In a different aspect, the portable terminal 2 may transmit the advertisement signal based on the request from the in-vehicle system 1.

Further, when receiving the reception data from the UWB communication portion 21, the portable terminal controller 23 generates the baseband signal corresponding to the response signal in accordance with this reception data, and outputs this baseband signal to the UWB communication portion 21. The baseband signal output from the portable terminal controller 23 to the UWB communication portion 21 is modulated by the UWB communication portion 21, and is transmitted as the wireless signal. Such a portable terminal controller 23 corresponds to a configuration that transmits the impulse signal as the response signal when receiving the impulse signal from the in-vehicle system 1 by cooperating with the UWB communication portion 21.

In addition, the operation mode of the portable terminal 2 includes an active mode and a sleep mode. The active mode is an operation mode capable of executing a process (process related to reception and response) such as generation of the response signal for the signal transmitted from the in-vehicle system 1. The sleep mode is an operation mode reducing a consumption electric power by stopping a part of functions or all functions of the portable terminal controller 23. For example, the sleep mode can be set to a mode that stops operation of a clock oscillator (not shown). The portable terminal controller 23 may shift to the active mode when the UWB communication portion 21 in the sleep mode receives the electric signal having the intensity corresponding to the impulse signal. Further, the portable terminal controller 23 may shift to the active mode when the BLE communication portion 22 receives electric signal corresponding to the BLE signal in the sleep mode. The electric signal corresponding to the BLE signal is, for example, a signal having a predetermined preamble to be included in the BLE signal or a signal having a predetermined intensity.

<In-Vehicle System>

The in-vehicle system 1 implements a passive entry passive start system (hereinafter, PEPS system) that executes a predetermined vehicle control in accordance with the position of the portable terminal 2 by executing the wireless communication with the portable terminal 2 with use of the electric waves in the predetermined frequency band.

For example, the in-vehicle system 1 executes the control such as opening or closing of a door based on a user operation on a door button 14 described later when it has been confirmed that the portable terminal 2 is present in an actuation area preliminarily set with respect to the vehicle Hv. Further, the in-vehicle system 1 executes a start control of the engine based on the user operation on a start button 15 described later when it can be confirmed that the portable terminal 2 exists in the vehicle interior by the wireless communication with the portable terminal 2.

The actuation area is an area for the in-vehicle system 1 to execute the predetermined vehicle control such as locking or unlocking of the door based on the presence of the portable terminal 2 in the area. For example, the vicinity of a door for a driver seat, the vicinity of a door for a driver's assistant seat, or the vicinity of a trunk door is set as the actuation area. The vicinity of the door refers to a range within a predetermined actuation distance from an outer door handle. The outer door handle indicates a gripping member provided on the outer side surface of the door for opening and closing the door. The actuation distance that defines the size of the actuation area is, for example, 0.7 meters. Of course, the actuation distance may be 1 meter, or may also be 1.5 meter. The actuation distance is preferably set to be smaller than 2 meters from the viewpoint of crime prevention.

Figure 3:
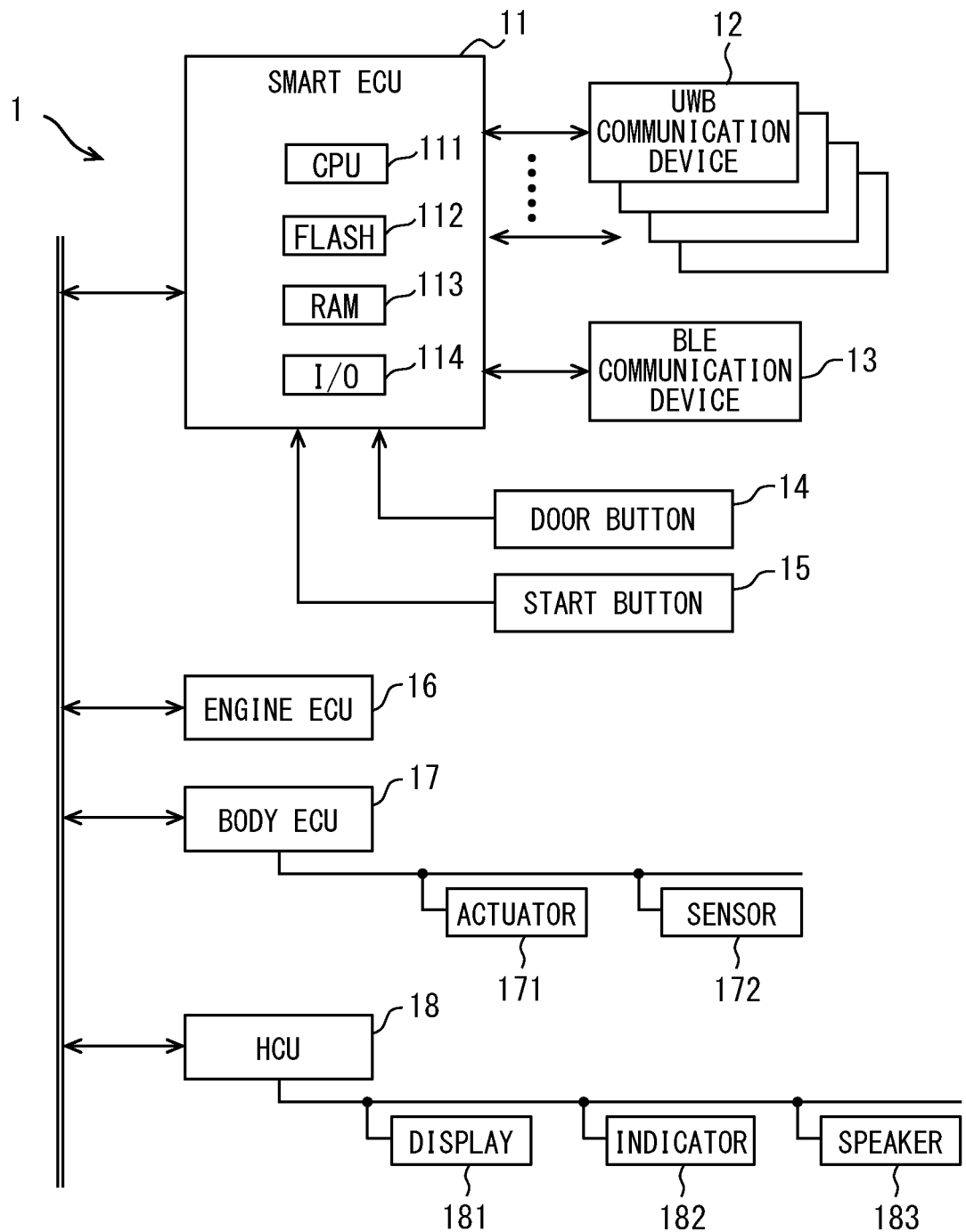
FIG. 3 is a functional block diagram for describing a configuration of an in-vehicle system.

As shown in FIG. 3, the in-vehicle system 1 includes a smart ECU 11, multiple UWB communication devices 12, a BLE communication device 13, the door button 14, the start button 15, an engine ECU 16, a body ECU 17, and a HCU 18. Further, the in-vehicle system 1 also includes an in-vehicle actuator 171, an in-vehicle sensor 172, a display 181, an indicator 182, a speaker 183, and the like. The ECU used in the names is an abbreviation for Electronic Control Unit, and means an electronic control device.

The smart ECU 11 is an ECU that executes the vehicle control such as unlocking the door or starting the engine by performing UWB communication with the portable terminal 2. The smart ECU 11 is mutually connected to the engine ECU 16, the body ECU 17, and the HCU 18 via a communication network constructed in the vehicle. Further, the smart ECU 11 is electrically connected to the UWB communication device 12, the BLE communication device 13, the door button 14, and the start button 15. The smart ECU 11 is implemented by using, for example, a computer. That is, the smart ECU 11 includes a CPU 111, a flash memory 112, a RAM 113, an I/O 114, a bus line connecting these configurations, and the like.

A terminal ID assigned to the portable terminal 2 owned by the user is registered in the flash memory 112. Further, the flash memory 112 stores a program (hereinafter, referred to as a position estimation program) for causing a computer to function as the smart ECU 11, and the like. The above-described position estimation program may be stored in a non-transitory tangible storage medium. Executing the position estimation program by the CPU 111 corresponds to executing a method corresponding to the position estimation program. The smart ECU 11 will be described in detail later.

The UWB communication device 12 is a communication module for performing UWB communication with the portable terminal 2. Each of the multiple UWB communication devices 12 can execute the UWB communication with a different UWB communication device 12 mounted on the vehicle Hv. That is, each UWB communication device 12 can wirelessly communicate with the portable terminal 2 and the different UWB communication device 12. For convenience, another UWB communication device 12 for a certain UWB communication device 12 is referred to as a different device. The UWB communication device 12 corresponds to an in-vehicle communication device.

Each UWB communication device 12 is connected to the smart ECU 11 via a dedicated communication line or an in-vehicle network so as to mutually communicate with the smart ECU 11. The operation of each UWB communication device 12 is controlled by the smart ECU 11. Each UWB communication device 12 is assigned with a unique communication device number. The communication device number is information corresponding to a terminal ID of the portable terminal 2. The communication device number functions as information for identifying the multiple UWB communication devices 12. Attachment positions or electrical configurations of the multiple UWB communication devices 12 will be described later.

The BLE communication device 13 is a communication module for executing the BLE communication. The BLE communication device 13 is connected to the smart ECU 11 so as to communicate with each other. The BLE communication device 13 receives the BLE signal transmitted from the portable terminal 2, and provides the BLE signal to the smart ECU 11. Further, the BLE communication device 13 modulates the data input from the smart ECU 11 and wirelessly transmits the data to the portable terminal 2. The BLE communication device 13 is attached to an arbitrary position of the vehicle Hv. For example, the BLE communication device 13 is attached to an instrument panel, an upper end portion of a windshield, a B-pillar, a rocker portion, and the like. The number of the BLE communication devices 13 may be one or plural.

The door button 14 is a button for the user to unlock and lock the door of the vehicle Hv. The door button 14 is placed on, for example, each door handle of the vehicle Hv. The door button 14 outputs the electric signal indicating that the button is pressed by the user to the smart ECU 11. The door button 14 corresponds to a configuration for the smart ECU 11 to receive the unlocking instruction and the locking instruction. A touch sensor may be used as the configuration for receiving at least one of the unlocking instruction or the locking instruction from the user. The touch sensor is a device that detects a touch on the door handle made by the user.

The start button 15 is a push switch for example that enables the user to start a driving source (for example, engine) of the vehicle Hv. When the user performs a push operation on the start button 15, the start button 15 outputs an electrical signal indicating the push operation to the smart ECU 11. As an example, the vehicle Hv is a vehicle provided with an engine as the driving source, but it is not limited to this example. The vehicle Hv may be an electric vehicle or a hybrid vehicle. When the vehicle Hv is a vehicle provided with a motor as the driving source, the start button 15 is a switch for starting the motor for driving.

The engine ECU 16 is an ECU that controls an operation of the engine mounted on the vehicle Hv. For example, when the engine ECU 16 acquires a start instruction signal that instructs starting of the engine from the smart ECU 11, the engine ECU 16 starts the engine.

The body ECU 17 is an ECU that controls the in-vehicle actuator 171 in response to a request from the smart ECU 11. The body ECU 17 is communicably connected to various in-vehicle actuators 171 and various in-vehicle sensors 172. Here, the in-vehicle actuators 171 is, for example, a door lock motor configuring a locking mechanism of each door, a seat actuator for adjusting a seat position, or the like. Here, the in-vehicle sensors 172 is a courtesy switch or the like equipped to each door. The courtesy switches are sensors that detects opening and closing of the door. The body ECU 17, for example, outputs a predetermined control signal to the door lock motors provided on the respective doors of the vehicle Hv based on a request from the smart ECU 11, thereby locking and unlocking the doors of the vehicle Hv.

The HCU 18 is a device that comprehensively controls presentation of the information, such as display or voice, to an occupant (mainly to a driver seat occupant). The HCU 18 controls operation of an HMI (Human Machine Interface) such as the display 181, the indicator 182, and the speaker 183. The HCU is an abbreviation for HMI control unit. Also the HCU 18 is implemented by a computer similarly to the ECU. The HCU 18 executes a process (hereinafter, a failure notification process) for notifying the occupant of the presence of UWB communication device 12 in which a failure occurs, based on the request from the smart ECU 11. For example, the HCU 18 displays, on the display 181, an image (hereinafter, a failure notification image) indicating that UWB communication device 12 in which a failure occurs is present based on the request from the smart ECU 11.

The display 181 is, for example, a meter display placed in front of the driver seat in the instrument panel. The display 181 may be a head up display, a multi-information display, a center information display, and the like. The indicator 182 is a device for notifying the occupant that the UWB communication device 12 having a failure is present by emitting the light. The speaker 183 is a device that outputs the voice or the sound input from the HCU 18.

<Attachment Position and Electrical Configuration of Each UWB Communication Device>

Figure 4:
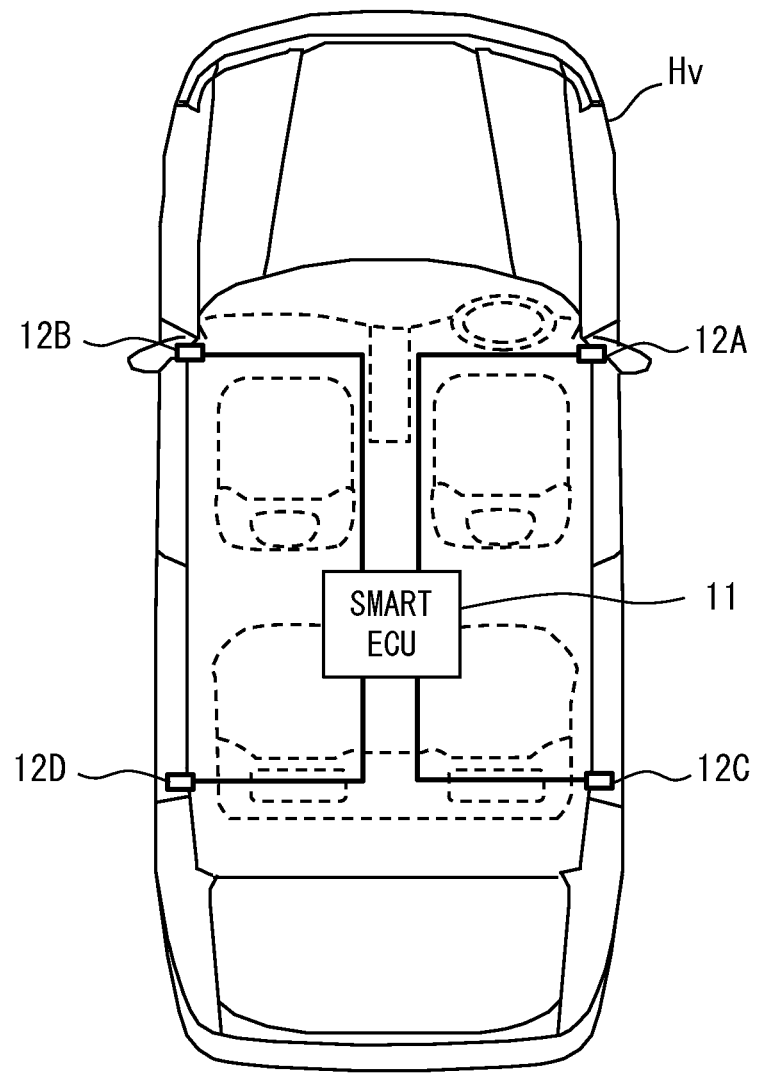
FIG. 4 is a diagram for describing one example of a mounting position of an UWB communication device.

As shown in FIG. 4, the in-vehicle system 1 of the present embodiment includes, as the UWB communication devices 12, a right front communication device 12A, a left front communication device 12B, a right rear communication device 12C, and a left rear communication device 12D. The right front communication device 12A is placed in, for example, an upper region of an A-pillar on the right side of the vehicle. The A-pillar is the first pillar from the front in the vehicle Hv. The A-pillar is also called a front pillar. The upper region of the pillar refers to a region that is the upper half of the pillar. The upper region of the pillar also includes the upper end of the pillar. The left front communication device 12B is placed in, for example, the upper region of the A-pillar on the left side of the vehicle. The right rear communication device 12C is placed in the upper region of the C-pillar on the right side of the vehicle. The left rear communication device 12D is placed on the upper region of the C-pillar on the left side of the vehicle. The C-pillar is the third pillar from the front. The C-pillar is also called a rear pillar.

Figure 5:
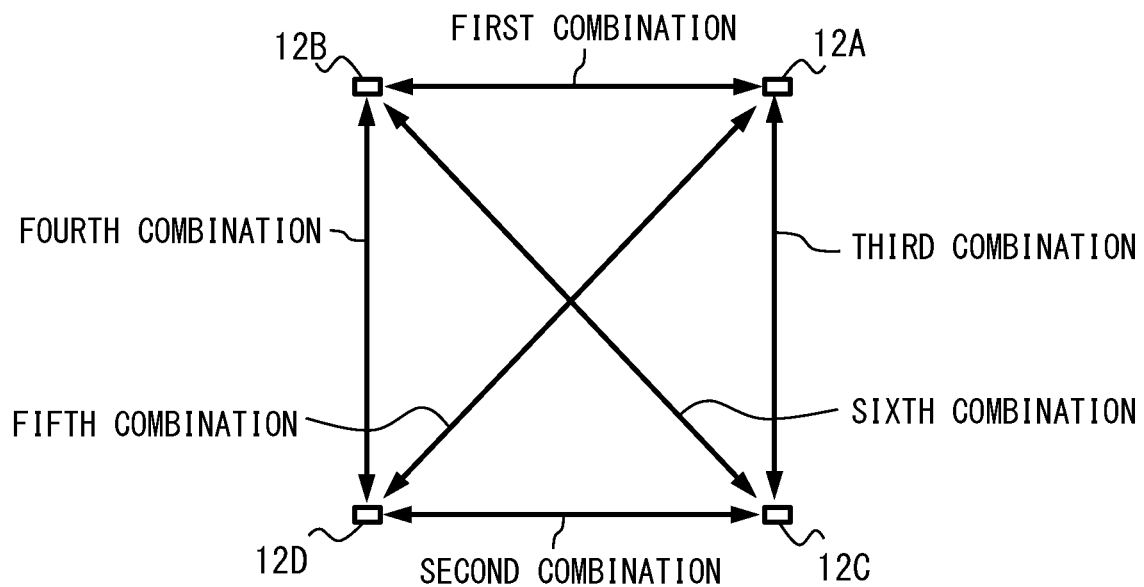
FIG. 5 is a diagram showing a combination of UWB communication devices of which positions are communicable positions with each other.

Each UWB communication device 12 can communicate with the different device as described above. For example, the right front communication device 12A can perform the UWB communication with each of the left front communication device 12B, the right rear communication device 12C, and the left rear communication device 12D. Hereinafter, for convenience, as shown in FIG. 5, as a combination of the UWB communication devices 12 that execute a bidirectional communication, a combination of the right front communication device 12A and the left front communication device 12B is referred to as a first combination. A combination of the right rear communication device 12C and the left rear communication device 12D is referred to as a second combination. A combination of the right front communication device 12A and the right rear communication device 12C is referred to as a third combination. A combination of the left front communication device 12B and the left rear communication device 12D is referred to as a fourth combination. A combination of the right front communication device 12A and the left rear communication device 12D is referred to as a fifth combination. A combination of the left front communication device 12B and the right rear communication device 12C is referred to as a sixth combination.

By the way, electric waves used in UWB communication are easily reflected by metal. Further, electric waves used in UWB communication are easily absorbed by the human body. Therefore, the electric waves are diffracted by an object (hereinafter, a shield) that reflects or absorbs the electric waves such as a metal body or a human body, and propagates. In a configuration that estimates the distance between communication devices with use of the propagation time of the electric waves, when the electric waves are propagated by diffraction, an error (hereinafter, diffraction error) occurs in the estimation distance between the communication devices.

Figure 6:
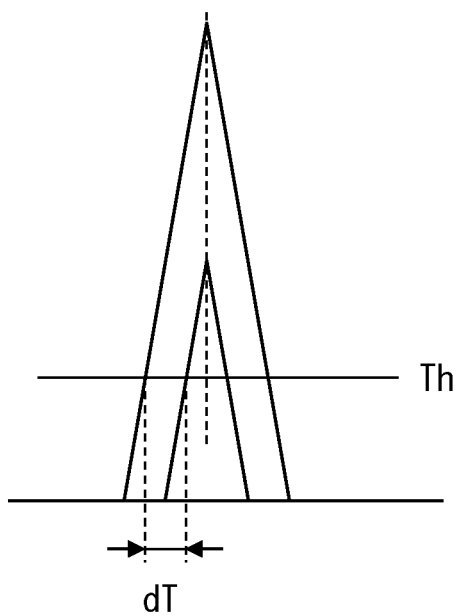
FIG. 6 is a diagram for describing an effect of reception intensity on a propagation time.

Further, in a propagation mode in which the electric waves are transmitted by diffracting the shield, the reception signal intensity in a reception device is lowered. In a case where the reception signal intensity is lowered, as shown in FIG. 6, even when a timing at which the peak of a reception electric power of an impulse signal arrives is the same, a timing at which the reception electric power exceeds a reception determination threshold Th may be delayed by about 0.5 nanoseconds to 1 nanosecond. In the propagation time method, when the propagation time is delayed by about 0.5 nanoseconds to 1 nanosecond, a distance error of about 15 centimeters to 30 centimeters occurs. Here, the reception determination threshold Th indicates a reception electric power level for determining that the impulse signal is received. A dT in FIG. 6 represents a detection delay time due to the difference in the reception electric power.

That is, as in the present embodiment, in a configuration that measures the distance by using the propagation time of the electric waves, it is preferable that the shield is unlikely to be present between the position where each UWB communication device 12 is placed and the position where the different device is placed. Further, from another viewpoint, it is preferable that each UWB communication device 12 is placed at a position where the visibility is good with respect to both the inside of the vehicle and the outside of the vehicle. The places with the good visibility with respect to the inside and the outside of the vehicle are, for example, an interior ceiling and each of the pillars. That is, as described above, the arrangement aspect of each UWB communication device 12 corresponds to one example of an aspect in which each UWB communication devices 12 is placed at a position with the good visibility with respect to the inside and the outside of the vehicle.

The installation position of each UWB communication device 12 in the vehicle Hv may be expressed as a point of a three-dimensional orthogonal coordinate system in which an arbitrary point of the vehicle is set to a reference point (in other words, the origin). Here, as one example, the center of the front wheel axle is set to the origin, and the installation position is represented as a point on a three-dimensional coordinate system (hereinafter, vehicular three-dimensional coordinate system) having X, Y, and Z axes orthogonal to each other. The X-axis forming the vehicular three dimensional coordinate system is parallel to a vehicle width direction, and the right side of the vehicle represents a positive direction of the X-axis. The Y-axis is parallel to the vehicular front-rear direction. The front of the vehicle represents a positive direction of the Y-axis. The Z-axis is parallel to the vehicular height direction. The above of the vehicle represents a positive direction of the Z-axis. The center of the three-dimensional coordinate system can be changed as appropriate, for example, changed to the center of the rear wheel axle. Of course, as another aspect, the mounting position of each UWB communication device 12 may be represented by polar coordinates. Communication device position data indicating the installation position of each UWB communication device 12 is stored in the flash memory 112. The placement position of each UWB communication device 12 may be stored in association with the communication device number.

Figures 7, 8:
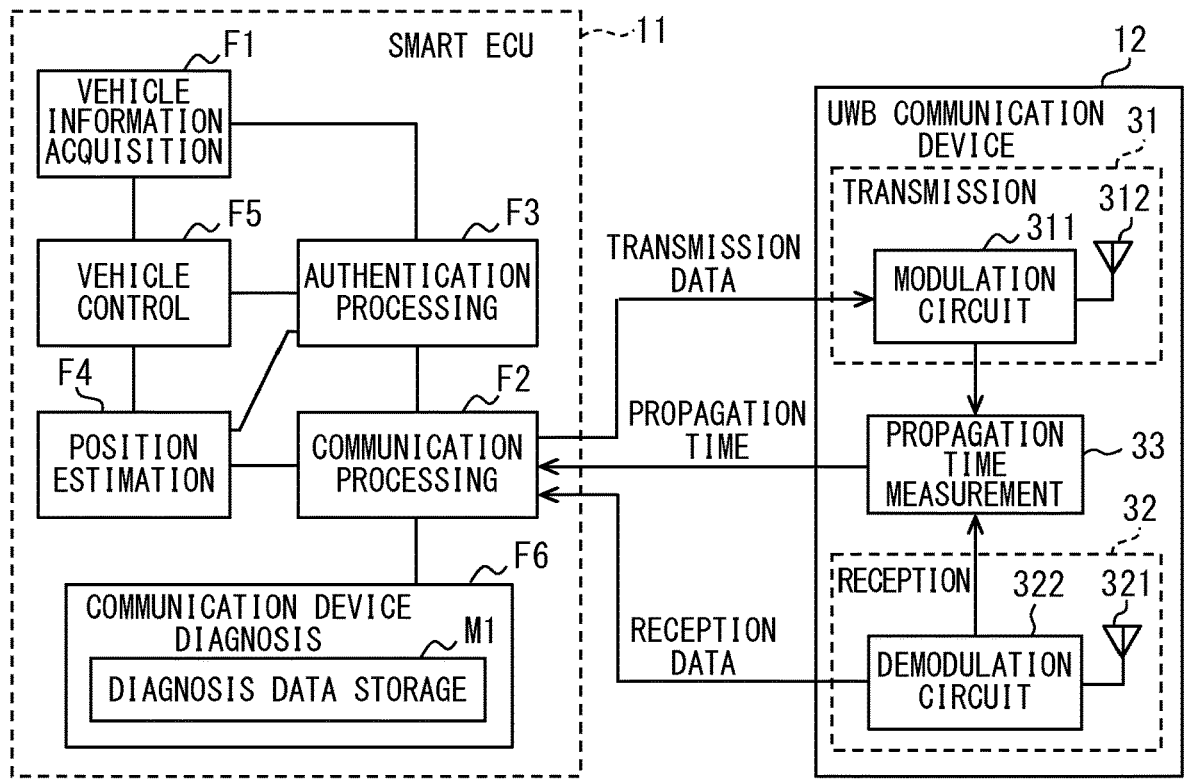
FIG. 7 is a block diagram showing configurations of a smart ECU and the UWB communication device.
FIG. 8 is a diagram showing one example of a normal range for each combination of the UWB communication devices.

Each of the multiple UWB communication devices 12 includes, as shown in FIG. 7, a transmission portion 31, a reception portion 32, and a propagation time measurement portion 33. The transmission portion 31 generates the impulse signal while electrically processing the impulse signal such as modulating the baseband signal input from the smart ECU 11, and radiates this impulse signal as the electric wave. The transmission portion 31 is implemented using, for example, a modulation circuit 311 and a transmission antenna 312.

The modulation circuit 311 is a circuit that modulates the baseband signal input from the smart ECU 11. The modulation circuit 311 generates a modulation signal corresponding to the data (hereinafter, transmission data) indicated by the baseband signal input from the smart ECU 11, and transmits the modulation signal to the transmission antenna 312. The modulation signal is a signal obtained by modulating transmission data by a predetermined modulation method. As described above, the modulation signal of the present embodiment corresponds to a signal sequence in which multiple impulse signals are arranged at time intervals in accordance with transmission data. The modulation circuit 311 includes a circuit that generates an electric impulse signal (hereinafter, a pulse generation circuit) and a circuit that amplifies or shapes the impulse signal.

The transmission antenna 312 converts the electric impulse signal output from the modulation circuit 311 into an electric wave and radiates the electric wave into space. That is, the transmission antenna 312 radiates a pulse-like electric wave having a predetermined bandwidth in the UWB band as an impulse signal. Further, when the modulation circuit 311 outputs the electric impulse signal to the transmission antenna 312, at the same time, the modulation circuit 311 outputs a signal (hereinafter, a transmission notification signal) indicating that the impulse signal is output, to the propagation time measurement portion 33.

The transmission portion 31 of the present embodiment is configured so that a rise time of the impulse signal is 1 nanosecond. The rise time is a time required fora signal intensity to exceed 90% of the maximum amplitude after the signal intensity exceeds 10% of the maximum amplitude for the first time. The rise time of the impulse signal is determined in accordance with the hardware configuration such as the circuit configuration of the transmission portion 31. The rise time of the impulse signal can be specified by a simulation or a real test. A rise time Tr of an impulse signal used in the UWB communication is typically approximately 1 nanosecond.

The reception portion 32 includes, for example, a reception antenna 321 and a demodulation circuit 322. The reception antenna 321 is an antenna for receiving an impulse signal. The reception antenna 321 outputs an electric impulse signal corresponding to the impulse signal transmitted by the portable terminal 2 to the demodulation circuit 322.

When the reception antenna 321 receives the impulse signal used in the UWB communication, the demodulation circuit 322 generates a reception signal while electrically processing the signal, such as demodulating the signal, and outputs the reception signal to the smart ECU 11. The pulse sequence signal acquired by the demodulation circuit 322 is a signal obtained by arranging multiple impulse signals input from the reception antenna 321 in time series at actual reception intervals. The demodulation circuit 322 demodulates a series of modulated signals (that is, pulse sequence signals) including multiple impulse signals transmitted from the portable terminal 2 or the different device, and restores the data before modulation.

The demodulation circuit 322 includes a frequency conversion circuit that converts the frequency of the impulse signal received by the reception antenna 321 into the baseband and outputs a signal in the baseband, an amplification circuit that amplifies a signal level, and the like. In addition, when the impulse signal is input from the reception antenna 321, the reception portion 32 outputs a signal indicating reception of the impulse signal (hereinafter, reception notification signal) to the propagation time measurement portion 33.

The propagation time measurement portion 33 is a timer that measures a time (hereinafter, round trip time) until the reception portion 32 receives the impulse signal after the transmission portion 31 transmits the impulse signal. The timing at which the transmission portion 31 transmits the impulse signal is specified by the input of the transmission notification signal. Further, the timing at which the reception portion 32 receives the impulse signal is specified by the input of the reception notification signal. That is, the propagation time measurement portion 33 measures a time period from a time when the modulation circuit 311 outputs the transmission notification signal to a time when the demodulation circuit 322 outputs the reception notification signal. The round trip time corresponds to a time obtained by adding the response processing time of the counterpart device (in other words, response device) to the signal flight time for the both-way.

The propagation time measurement portion 33 counts a clock signal input from a clock oscillator (not shown) to measure an elapsed time from the transmission portion 31 transmitting the impulse signal. The count by the propagation time measurement portion 33 is stopped when the reception notification signal is input or when a count value reaches a predetermined upper limit value, and the count value is output to the smart ECU 11. That is, the round trip time is reported to the smart ECU 11. When the round trip time is reported to the smart ECU 11, the count value of the propagation time measurement portion 33 returns to 0 (that is, is reset).

When the measurement of the round trip time is completed, the propagation time measurement portion 33 calculates the propagation time based on the round trip time and provides the propagation time to the smart ECU 11. The propagation time measurement portion 33 corresponds to a propagation time identification portion. The propagation time measurement portion 33 related to the calculation of the propagation time will be described later. The propagation time measurement portion 33 is implemented by using, for example, an IC. In addition, the UWB communication device 12 includes a reflection response mode similarly to the UWB communication portion 21 of the portable terminal 2. The reflection response mode of the UWB communication device 12 is similar to the reflection response mode of the UWB communication portion 21.

Here, the aspect of the UWB communication device 12 in which the antenna (that is, transmission antenna 312) for transmission and the antenna (that is, reception antenna 321) for reception are separated from each other has been described. However, the mode of the UWB communication device 12 is not limited to this. The UWB communication device 12 may include one antenna element for transmission and reception by using a directional coupler. Further, the modulation circuit 311 or the demodulation circuit 322 may be built in the IC that provides a function as the propagation time measurement portion 33. That is, the UWB communication device 12 may be implemented by one antenna and one dedicated IC having various circuit functions.

<Function of Smart ECU>

The smart ECU 11 programs a function corresponding to various functional blocks shown in FIG. 7 by executing the above described position estimation program. In other words, the smart ECU 11 includes, as functional blocks, a vehicle information acquisition portion F1, a communication processing portion F2, an authentication processing portion F3, a position estimation portion F4, a vehicle control portion F5, and a communication device diagnosis portion F6.

The vehicle information acquisition portion F1 acquires various pieces of information indicating a state of the vehicle Hv (hereinafter, vehicle information) from sensors, ECUs (for example, body ECU 17), switches, and the like mounted on the vehicle Hv. The vehicle information includes, for example, an open-closed state of the door, a locked-unlocked state of each door, whether the door button 14 is pressed, whether the start button 15 is pressed, or the like. The vehicle information acquisition portion F1 specifies a current state of the vehicle Hv based on the various information described above. For example, when the engine is off and all of the doors are locked, the vehicle information acquisition portion F1 determines that the vehicle Hv is in a parked state. Of course, the condition for determining that the vehicle Hv is parked may be designed as appropriate, and various determination conditions can be applied.

The acquisition of the information indicating the locked-unlocked state of each door corresponds to the determination of the locked-unlocked state of each door and the detection of the locking operation-unlocking operation of the door by the user. Further, the acquisition of electric signals from the door button 14 and the start button 15 corresponds to detection of the user operation on those buttons. That is, the vehicle information acquisition portion F1 corresponds to a configuration for detecting the user operation on the vehicle Hv, such as opening and closing of the door 14, pressing of the door button 14, pressing of the start button 15, and the like. The vehicle information described hereinafter includes the user operation on the vehicle Hv. In addition, the types of information included in the vehicle information are not limited to the examples described above. The vehicle information also includes a shift position detected by a shift position sensor (not shown), a detection result of a brake sensor for detecting depression operation on a brake pedal, and the like. The operation state of the parking brake may also be included in the vehicle information.

The communication processing portion F2 transmits data to the portable terminal 2 and receives data from the portable terminal 2 in cooperation with the UWB communication device 12 or the BLE communication device 13. For example, the communication processing portion F2 generates data addressed to the portable terminal 2, and outputs the data to the BLE communication device 13. Thereby, the communication processing portion F2 transmits a signal corresponding to the data as the electric wave. The communication processing portion F2 receives data from the portable terminal 2 via the BLE communication device 13 In the present embodiment, as a more preferable example, the wireless communication between the smart ECU 11 and the portable terminal 2 is executed in an encrypted manner. As an encryption method of the encrypted communication, various methods, such as an encryption method defined by Bluetooth can be used.

In the present embodiment, the smart ECU 11 and the portable terminal 2 encrypt and perform a data communication for authentication or the like in order to improve security. However, it is not limited to this. As another aspect, the smart ECU 11 and the portable terminal 2 may perform the data communication without encryption.

The communication processing portion F2 recognizes that the user is present in the vicinity of the vehicle Hv based on the establishment of the BLE communication with the portable terminal 2. Further, the communication processing portion F2 acquires the terminal ID of the portable terminal 2 communicably connected to the BLE communication device 13 from the BLE communication device 13. According to such a configuration, even when the vehicle Hv is a vehicle shared by multiple users, the smart ECU 11 can specify a user who is present in the vicinity of the vehicle Hv based on the terminal ID of the portable terminal 2 to which the BLE communication device 13 is communicatively connected.

Further, the communication processing portion F2 acquires data from the portable terminal 2 via the UWB communication device 12. In addition, the communication processing portion F2 generates the data addressed to the portable terminal 2, and outputs the data to the UWB communication device 12. Thereby, the pulse sequence signal corresponding to the predetermined data is wirelessly transmitted. Further, the communication processing portion F2 causes an arbitrary UWB communication device 12 to transmit the impulse signal based on instructions from the position estimation portion F4 or the communication device diagnosis portion F6. The UWB communication device 12 caused to transmit the impulse signal is selected by the position estimation portion F4 or the communication device diagnosis portion F6.

The authentication processing portion F3 executes a process of confirming that the communication partner is the portable terminal 2 of the user (in other words, authenticating the portable terminal 2) in cooperation with the BLE communication device 13. The communication for authentication is performed in the encrypted manner via the BLE communication device 13. That is, the authentication process is performed by an encrypted communication. The authentication process itself may be executed by various methods such as a challenge-response method. Here, a detailed description of the authentication process will be omitted here. It is assumed that data (for example, encryption key) or the like required for the authentication process is stored in each of the portable terminal 2 and the smart ECU 11. For example, a timing at which the authentication processing portion F3 executes the authentication process may be set to a timing at which the communication connection between the BLE communication device 13 and the portable terminal 2 is established. The authentication processing portion F3 may be configured to execute the authentication process at a predetermined cycle while the BLE communication device 13 and the portable terminal 2 are in communication connection. Further, the authentication processing portion F3 may be configured such that the encrypted communication for the authentication process is executed by using a predetermined user operation on the vehicle Hv as a trigger, for example, in response to a pressing operation made on the start button 15 by the user.

In the Bluetooth standard, the communication connection between the BLE communication device 13 and the portable terminal 2 is established means that a communication partner of the BLE communication device 13 is the portable terminal 2 registered in advance. Therefore, the smart ECU 11 may determine that the portable terminal 2 has been successfully authenticated based on the condition that the communication connection between the data BLE communication device 13 and the portable terminal 2 has been established.

The position estimation portion F4 executes a process of estimating the position of the portable terminal 2. The position estimation portion F4 estimates the distance from each UWB communication device 12 to the portable terminal 2 by causing each UWB communication device 12 to transmit the impulse signal to the portable terminal 2 and receive the impulse signal from the portable terminal 2 in a predetermined order. Then, the position of the portable terminal 2 is estimated based on the distance information from each UWB communication device 12 to the portable terminal 2. A position estimation process by the position estimation portion F4 will be described later.

The vehicle control portion F5 executes a vehicle control in accordance with the position of the portable terminal 2 (in other words, the user) and the state of the vehicle Hv in cooperation with the body ECU 17 or the like when the authentication of the portable terminal 2 executed by the authentication processing portion F3 is successful. The state of the vehicle Hv is determined by the vehicle information acquisition portion F1. The position of the portable terminal 2 is determined by the position estimation portion F4.

For example, when the portable terminal 2 is present outside the vehicle compartment and the user presses the door button 14 while the vehicle Hv is parked, the vehicle control portion F5 unlocks the door locking mechanism in cooperation with the body ECU 17. Further, for example, when the portable terminal 2 is determined to be present inside the vehicle by the position estimation portion F4 and it is detected that the start button 15 has been pressed by the user, the vehicle control portion F5 starts the engine in cooperation with the engine ECU 16. In such a manner, the vehicle control portion F5 executes a vehicle control according to the position of the user and the state of the vehicle Hv with the user operation on the vehicle Hv as a trigger. However, some vehicle controls that can be executed by the vehicle control portion F5 may be automatically executed according to the position of the user without requiring the user's operation on the vehicle Hv.

The communication device diagnosis portion F6 determines whether each UWB communication device 12 is in a normal state (in other words, whether a failure has occurred). The details of the communication device diagnosis portion F6 will be described later. Here, the failure is, for example, a poor contact between a signal line and a circuit element or an amplifier malfunction. When the poor contact of the signal line or the amplifier is not operating, the reception level (in other words, reception sensitivity) of the impulse signal is lower than that in the normal state and the timing when the reception electric power of the impulse signal exceeds the predetermined detection threshold may be delayed by about 0.5 nanoseconds to 1 nanosecond. Here, the failure includes a failure that causes a minute delay of about several nanoseconds. Of course, the failure includes an internal failure that causes a state where the communication cannot be performed such as disconnection of the signal line or an IC abnormality or a communication delays (for example, one millisecond or more) greatly exceeding the detection range of the position of the portable terminal 2. Here, the failure described here includes, in addition to the internal failure, a state where the communication device is removed from the predetermined attachment position.

The communication device diagnosis portion F6 includes a diagnosis data storage portion M1 that stores data (hereinafter, diagnosis data) for determining whether each UWB communication device 12 is in a normal state. The diagnosis data storage portion M1 stores, as the diagnosis data as shown in FIG. 8, data indicating a normal range of the signal propagation time for each combination of the UWB communication devices 12. The signal propagation time (hereinafter, simply, referred to as the propagation time) is a time until the wireless signal transmitted from one UWB communication device 12 is received by another device. Such a propagation time corresponds to a TOF (Time Of Flight) for the one-way. Further, the propagation time functions as an index of a distance (hereinafter, inter-communication device distance) between the UWB communication devices.

The normal range of the propagation time for each combination of the UWB communication devices 12 is represented by a time concept such as, for example, [nanoseconds]. The normal range may be a range from a reference value in accordance with the inter-communication device distance to a predetermined permissible value. According to another viewpoint, the reference value corresponds to a center value of the normal range. The normal range for each combination of the UWB communication devices 12 may be measured in advance by a test. The normal range for each combination of the UWB communication devices 12 may be a design value based on simulation or the like. Hereinafter, for convenience, the normal range registered at a factory, a dealer shop, or the like is also referred to as a default normal range. Further, the center value of the default normal range is also referred to as a default reference value. The center value (that is, reference value) of the normal range for each combination of the UWB communication devices 12 may be set to a value in accordance with a linear distance between the communication devices.

The normal ranges of the first combination and the second combination illustrated in FIG. 8 show one example of a case where a linear distance between the right front communication device 12A and the left front communication device 12B and a linear distance between the right rear communication device 12C and the left rear communication device 12D are 1.8 meters. Since the light speed is $3.0 \times 10^8$ [m/s], the propagation time corresponding to 1.8 meters is about 5.5 nanoseconds. The normal ranges of the first combination and the second combination in FIG. 8 correspond to a range obtained by adding a width of ±0.5 nanoseconds (in other words, margin) to 5.5 nanoseconds that is a theoretical value of the propagation time.

The normal ranges of the third combination and the fourth combination illustrated in FIG. 8 show one example of a case where a linear distance between the right front communication device 12A and the right rear communication device 12C and a linear distance between the left front communication device 12B and the left rear communication device 12D are 2.5 meters. The propagation time corresponding to 2.5 meters is about 7.6 nanoseconds. The normal ranges of the third combination and the fourth combination in FIG. 8 correspond to a range obtained by adding a width of ±0.5 nanoseconds to 7.6 nanoseconds that is the theoretical value of the propagation time.

The normal ranges of the fifth combination and the sixth combination illustrated in FIG. 8 show one example of a case where a linear distance between the right front communication device 12A and the left rear communication device 12D and a linear distance between the left front communication device 12B and the right rear communication device 12C are 3.1 meters. The propagation time corresponding to 3.1 meters is about 9.3 nanoseconds. The normal ranges of the fifth combination and the sixth combination in FIG. 8 correspond to ranges obtained by adding a width of ±0.5 nanoseconds to 9.3 nanoseconds that is the theoretical value of the propagation time.

The electric wave propagates about 15 centimeters in 0.5 nanoseconds. That is, the above-described configuration corresponds to an aspect in which the range obtained by about ±15 centimeters to the linear distance between the communication devices is set to the normal range. Further, in the present embodiment, as one example, the normal range is defined by the time concept. However, it is not limited to this. As another aspect, the normal range is may be defined by a distance concept such as [meters]. The above-described example corresponds to an aspect in which the theoretical value of the propagation time is adopted as the reference value and the permissible value is set to 0.5 nanoseconds. Twice the permissible value corresponds to a width of the normal range. The width (that is, normal range width) from the upper limit to the lower limit of the normal range is preferably set to be smaller than a value corresponding to 2 meters from the viewpoint of ensuring the estimation accuracy of the portable terminal 2. The value corresponding to 2 meters is 6.7 nanoseconds in terms of propagation time. The diagnosis data storage portion M1 corresponds to a normal range storage.

<Position Estimation Process>

Figure 9:
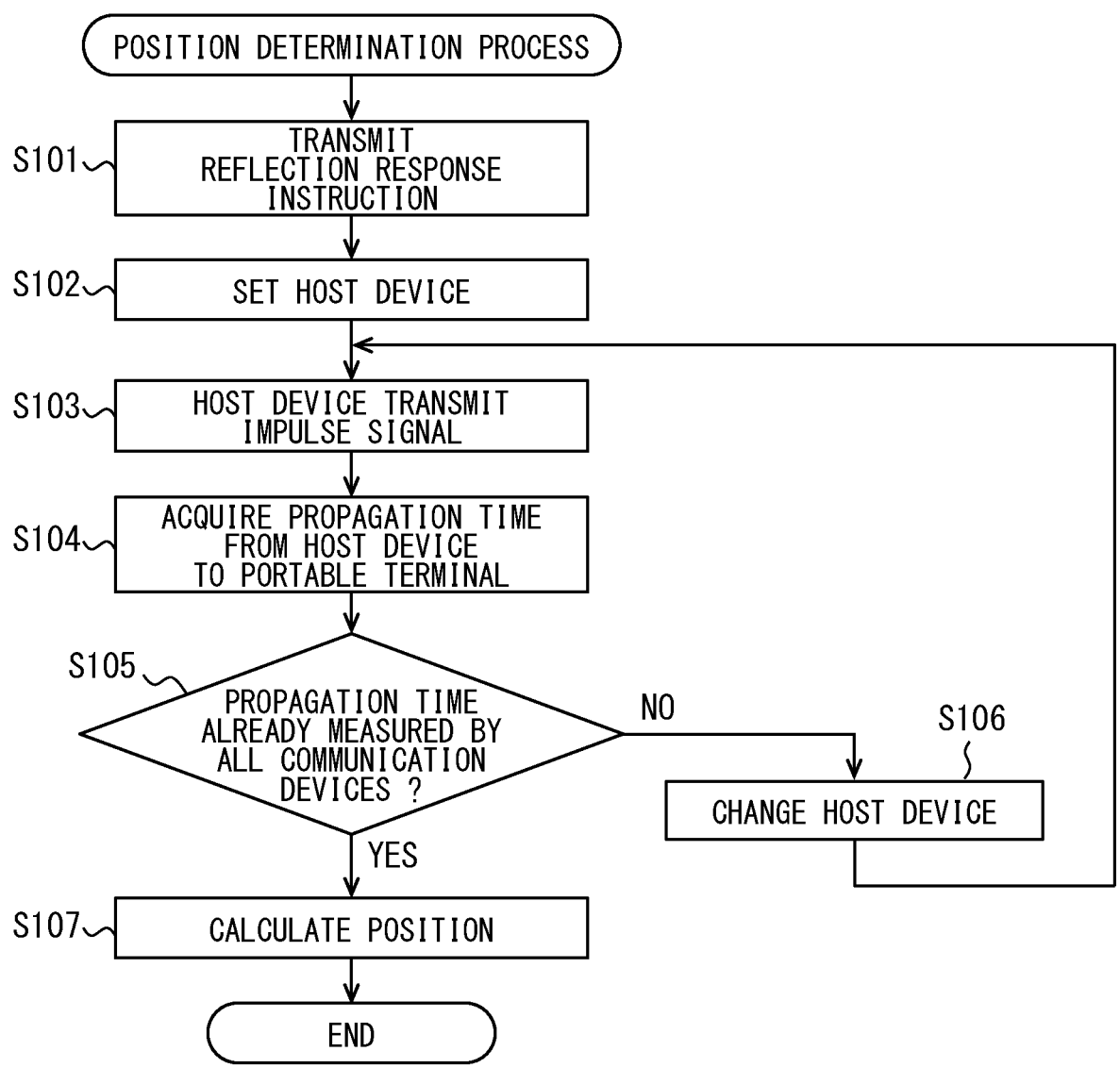
FIG. 9 is a flowchart of a position estimation process.

Next, the position estimation process executed by the smart ECU 11 will be described with reference to a flowchart shown in FIG. 9. The position estimation process is a process for determining the position of the portable terminal 2. The position estimation process is executed, for example, at a predetermined position estimation cycle in a state where the communication connection between the BLE communication devices 13 and the portable terminal 2 is established. The position estimation cycle may be set to, for example, 200 milliseconds. Of course, the position estimation cycle may be set to 100 milliseconds or 300 milliseconds. In the present embodiment, as one example, the position estimation process includes S101 to S107. Each process content is mainly executed by the position estimation portion F4 in cooperation with the UWB communication device 12, the BLE communication device 13, the communication processing portion F2, or the like.

First, in S101, in cooperation with the communication processing portion F2, the BLE communication device 13 is caused to transmit a reflection response instruction signal addressed to the portable terminal 2. The reflection response instruction signal is a signal instructing the portable terminal 2 to operate in the reflection response mode. Thereby, the portable terminal 2 operates so as to reflexively return the impulse signal each time the portable terminal 2 receives the impulse signal transmitted from the in-vehicle system 1.

Next, in S102, the arbitrary UWB communication device 12 is set to a host device. The host device corresponds to the UWB communication device 12 that measures the round trip time among the multiple UWB communication devices 12. When the process in S102 is completed, S103 is executed. In S103, the host device transmits the impulse signal. Thereby, in S104, a propagation time Ta that is a time until the portable terminal 2 receives the wireless signal transmitted by the host device is acquired. Then, the UWB communication device 12 other than the host device is controlled so as to stop the operation or so as not to return the impulse signal as the response signal even when receiving the impulse signal.

Figure 10:
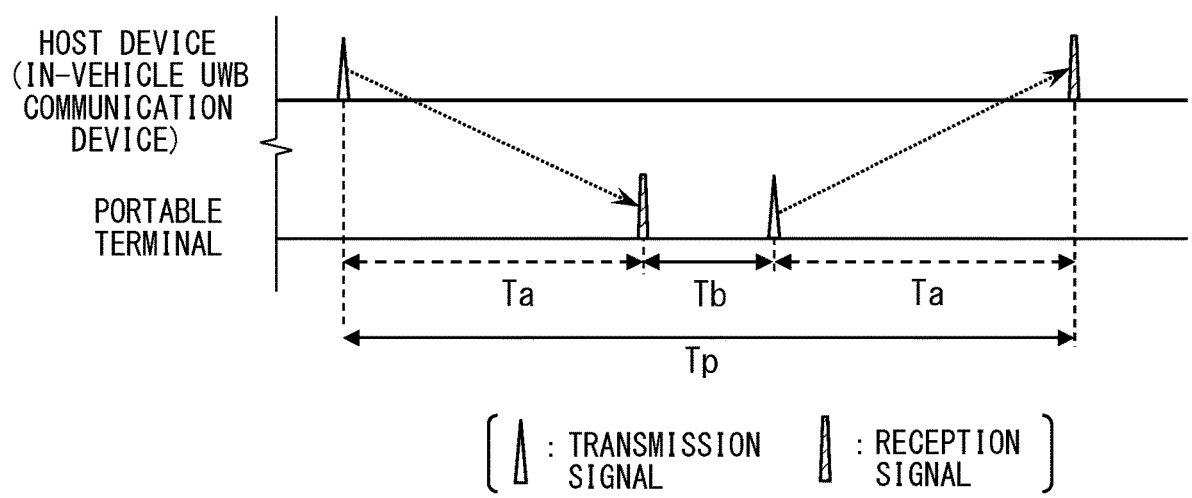
FIG. 10 is a diagram showing a relationship between the propagation time and a round trip time.

In S103 to S104 described above, the propagation time measurement portion 33 of the host device measures a round trip time Tp based on the instruction from the position estimation portion F4, as shown in FIG. 10. Then, the assumed value of the response processing time Tb in the portable terminal 2 is subtracted from the round trip time Tp. The assumed value of the response processing time Tb may be registered, as a parameter for calculation, in the flash memory 112. The value obtained by subtracting the response processing time Tb from the round trip time Tp corresponds to a flight time for the both-way. Therefore, a value obtained by dividing, by 2, the value obtained by subtracting the response processing time Tb from the round trip time Tp corresponds to a flight time for the one-way of the wireless signal. The propagation time measurement portion 33 provides, as the propagation time Ta, the value obtained by dividing, by 2, the value obtained by subtracting the response processing time Tb from the round trip time Tp, to the smart ECU 11. The propagation time measurement portion 33 may provide a value indicating that the propagation time Ta is unknown to the smart ECU 11, when the impulse signal as the response signal has not been received in a case where a predetermined response waiting time has elapsed after the impulse signal is transmitted. The response waiting time may be set to, for example, a value such as 33 nanoseconds on assumption of a state where the user is sufficiently away from the vehicle Hv (for example, 10 meters).

In S105, it is determined whether all UWB communication devices 12 are caused to measure the propagation time Ta. When the propagation times Ta of all UWB communication devices 12 have been acquired, the determination in S105 is positive, and S107 is executed. On the other hand, when there is the UWB communication device 12 that has not yet measured the propagation time Ta, the determination in S105 is negative, and S106 is executed.

In S106, an arbitrary UWB communication device 12 that has not yet measured the propagation time Ta is set to the host device, and S103 is executed. The order in which the host device is set (in other words, the order in which the impulse signal is transmitted) may be appropriately designed. For example, the position estimation portion F4 sets, to the host device, the right front communication device 12A, the left front communication device 12B, the right rear communication device 12C, and the left rear communication device 12D in this order. As described above, the propagation time Ta measured by each UWB communication device 12 corresponds to distance information to the portable terminal 2 (in other words, distance index value). Therefore, a series of processes from S103 to S106 corresponds to a process of collecting the distance information from each UWB communication device 12 to the portable terminal 2 by causing each UWB communication device 12 to transmit the impulse signal.

In S107, the position of the portable terminal 2 is calculated based on the installation position of each UWB communication device 12 and the distance information from each UWB communication device 12 to the portable terminal 2. Communication device position data stored in the flash memory 112 may be used for the installation position of each UWB communication device 12. The distance from each UWB communication device 12 to the portable terminal 2 may be set to a value obtained by multiplying the propagation time Ta of each UWB communication device 12 by the speed of light. The position estimation based on the installation position of each UWB communication device 12 and the distance information from each UWB communication device 12 to the portable terminal 2 can be performed by using the principle of triangulation. As the position estimation method using the installation position of each UWB communication device 12 and the distance information to the portable terminal 2, various algorithms such as the least squares method, the Newton-Raphson method, or the MMSE (Minimum Mean Square Estimate) method can be adopted.

The calculated position (hereinafter, terminal position) of the portable terminal 2 in the above-described manner is referred by the vehicle control portion F5 or the like. For example, it is determined whether the terminal position calculated in S107 is in the actuation area or inside the vehicle. When the terminal position is in the actuation area, the vehicle control portion F5 locks or unlocks the door based on the determination result. Further, when the terminal position is inside the vehicle, the vehicle control portion F5 starts the traveling driving source based on the determination result.

<Diagnosis-Related Process>

Figure 11:
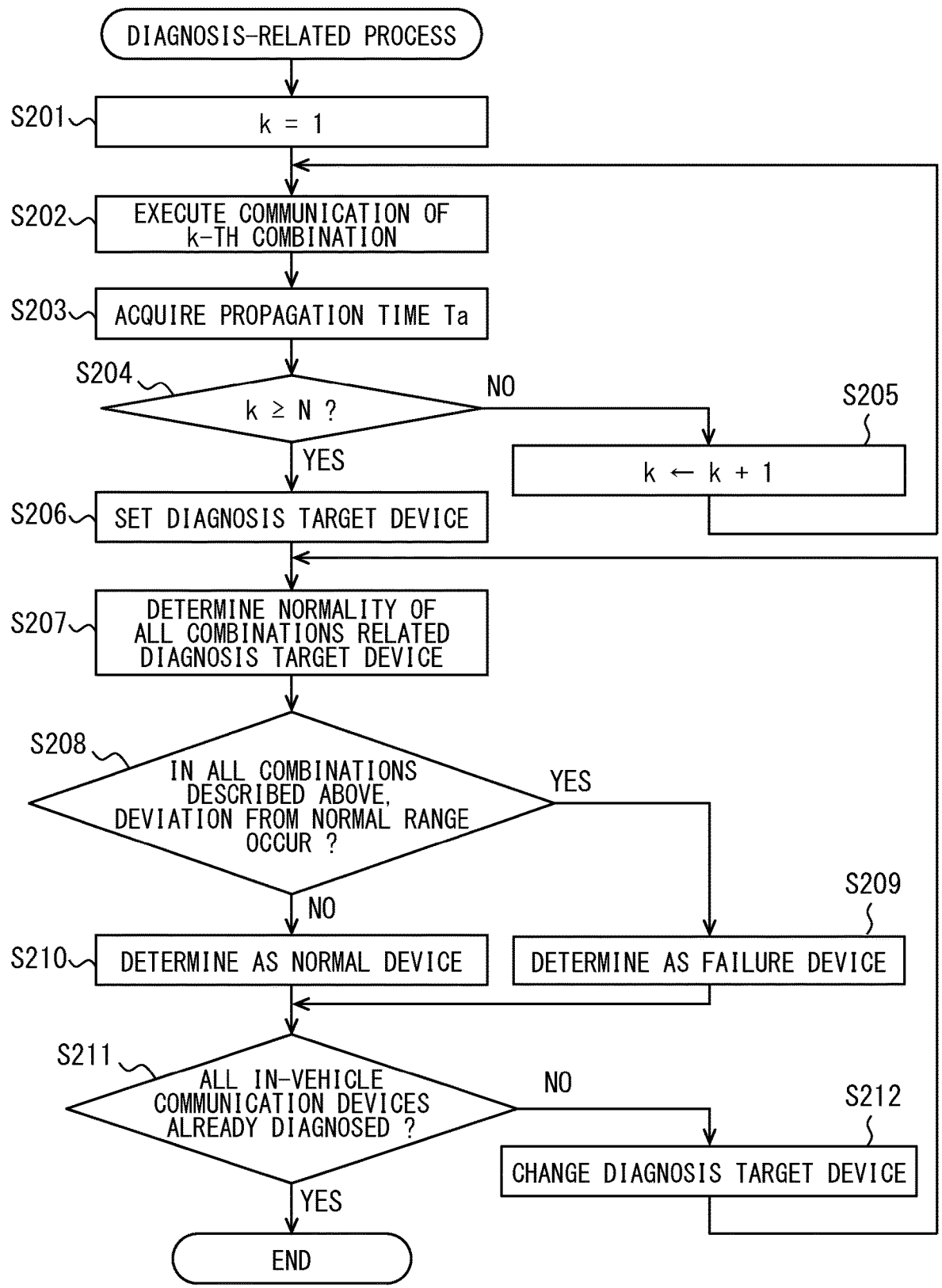
FIG. 11 is a flowchart of a diagnosis-related process.

Next, a diagnosis-related process executed by the smart ECU 11 will be described with reference to a flowchart shown in FIG. 11. The diagnosis-related process is a process for determining whether each UWB communication device 12 is in the normal state. The diagnosis-related process is periodically executed at, for example, a predetermined self-diagnosis cycle. The self-diagnosis cycle is, for example, 1 hour. Of course, in addition, the diagnosis-related process may be executed at a predetermined timing such as a timing when the vehicle Hv is parked, a timing when a predetermined time has elapsed after the vehicle Hv is parked, or a timing when the user's approach to the vehicle Hv is detected. The approach of the user to the vehicle Hv may be detected based on, for example, the reception of the advertisement signal by the BLE communication device 13 from the portable terminal 2. The diagnosis-related process is preferably executed when no occupant is inside the vehicle, that is, the vehicle is parked and the like. Further, the position estimation process described above may be executed after the diagnosis-related process is executed.

In the present embodiment, as one example, the diagnosis-related process includes S201 to S212. Each process content is mainly executed by the communication device diagnosis portion F6 in cooperation with the UWB communication device 12, the BLE communication device 13, the communication processing portion F2, or the like.

First, in S201, a k, which is a variable parameter used in the subsequent process, is set to 1 (in other words, initialized), and S202 is executed. In S202, the k-th combination is selected as a combination of the UWB communication devices 12 that perform bidirectional wireless communication. Then, bidirectional wireless communication is performed using any one of the UWB communication devices 12 constituting the k-th combination as the host device. Thereby, the propagation time Ta is acquired as the distance information between the communication devices of the k-th combination (S203). The communication device diagnosis portion F6 that executes S203 corresponds to a distance index value acquisition portion. Further, the propagation time Ta acquired by the above-described process corresponds to the distance index value. Therefore, the bidirectional wireless communication executed by the UWB communication devices 12 of the k-th combination in S202 corresponds to a wireless communication for acquiring the distance index value.

As the content of the wireless communication for acquiring the distance index value, it is assumed that a single impulse signal is transmitted and received. Of the two UWB communication devices constituting the k-th combination, the UWB communication device 12 operating as the host device may be appropriately selected. Of the two UWB communication devices 12 constituting the k-th combination, the UWB communication device 12 that is not the host device operates in the reflection response mode. The UWB communication device 12 other than the two UWB communication devices 12 constituting the k-th combination is controlled to stop the operation or not to return the single pulse signal as the response signal even when receiving the impulse signal.

For example, when the k is equal to 1, in S202, the right front communication device 12A and the left front communication device 12B constituting the first combination transmit and receive the impulse signal. More specifically, the right front communication device 12A is set to the host device, and the left front communication device 12B is set to be the reflection response mode. Then, the right front communication device 12A is caused to transmit the impulse signal, and the propagation time Ta of the wireless signal from the right front communication device 12A to the left front communication device 12B is acquired. The calculation process of the propagation time Ta is described above with reference to FIG. 10. The propagation time Ta may be set to a value obtained by dividing, by 2, a value obtained by subtracting the predetermined response processing time Tb from the round trip time Tp. The propagation time Ta is a propagation time Ta of the first combination.

In S204, it is determined whether the k that is the variable parameter is equal to or more than a N that is the total number of combinations of UWB communication devices 12 for which the propagation time Ta should be measured (that is, whether k≥N). In the present embodiment, the N is equal to 6. When the k is equal to or more than the N, the determination in S204 is positive and the S206 is executed. On the other hand, the k is less than N, the determination in S204 is negative and S205 is executed. In S205, the value of k is incremented, and the S202 is executed. That is, the processes of S202 to S205 are repeated until k becomes equal to N. Thereby, the propagation times Ta are collected for all the combinations for which the propagation time Ta should be measured.

In S206, an arbitrary UWB communication device 12 is set to a diagnosis target device, S207 is executed. In S207, it is determined whether the propagation time Ta is within the normal range for all the combinations related to the diagnosis target device. All combinations related to the diagnosis target device are combinations having the diagnosis target devices as configuration elements. For example, all the combinations related to the right front communication device 12A are the first combination, the third combination, and the fifth combination. Further, all the combinations related to the left front communication device 12B are the first combination, the fourth combination, and the sixth combination. The normal range for each combination is specified by referring to the diagnosis data stored in the diagnosis data storage portion M1.

When, in all the combinations related to the diagnosis target device, the propagation time Ta is outside the normal range, the determination in S208 is positive and the process shifts to S209. On the other hand, when, in at least one of all the combinations related to the diagnosis target device, the propagation time Ta is inside the normal range, the determination in S208 is negative and the process shifts to S210.

In S209, the diagnosis target device is determined to be a communication device (hereinafter, failure device) having a failure, and the process shifts to S211. In S210, the diagnosis target device is determined to be normal, and the process shifts to S211. The communication device that is normal is also referred to as a normal device.

In S211, it is determined whether the processes (hereinafter, diagnosis process) of S207 to S210 have been executed on all the UWB communication devices 12. When all the UWB communication devices 12 have been diagnosed, the determination in S211 is positive and this flow ends. On the other hand, when there the UWB communication device 12 that has not executed the diagnosis process remains, the UWB communication device 12 that is not diagnosed is set to the diagnosis target device, and S207 is executed.

When the failure device is found, the smart ECU 11 (for example, the communication device diagnosis portion F6) requests the HCU 18 to execute the failure notification process. The failure notification process is, as described above, a process of notifying the user that the failure device is present via the notification device such as the display 181, the indicator 182, or the speaker 183. As the notification device, the portable terminal 2 of the user can be adopted. For example, when the failure device is found, the predetermined BLE signal may be transmitted to the portable terminal 2, and the failure notification image may be displayed on a display of the portable terminal 2. According to such an aspect, the user can recognize the presence of the failure device. A diagnosis ECU (not shown) may be notified of the diagnosis result, and the diagnosis result may be stored as a log for a certain period of time.

Further, when the result of the above-described diagnosis-related process shows that the failure device is found, the position estimation portion F4 may be notified of a communication device number of the failure device. In such a configuration, the position estimation portion F4 may not use the distance information with the portable terminal 2 observed by the failure device for the position estimation process. According to the control aspect, it is possible to reduce the possibility of erroneously determining the terminal position based on the presence of the failure device.

<Effects of Above-Described Embodiment>

Here, the effects of the present embodiment will be described by introducing a comparison configuration. The comparative configuration is also a configuration that detects the failure device based on the propagation time between the communication devices. However, in the comparative configuration, when there is at least one combination in which the propagation time is outside the normal range among the multiple combinations related to the diagnosis target device, the diagnosis target device is determined to be the failure device.

Figure 12:
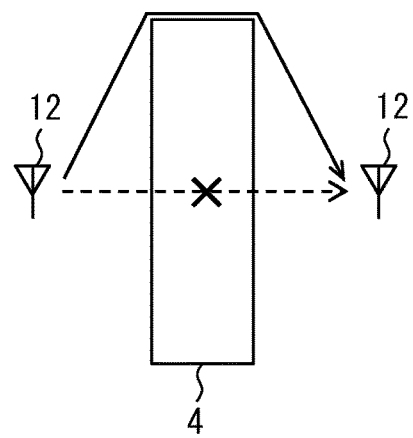
FIG. 12 is a diagram for describing an influence on the propagation time when a wireless signal is diffracted by a shield and propagated.

Even in such a comparative example, by setting the normal range for each combination to be narrow, it is possible to detect the failure causing the minute delay such as, for example, several nanoseconds, similarly to the present embodiment. However, the cause of the error in the propagation time is not limited to the malfunction of the component. As shown in FIG. 12, when a shield 4 of the metal body or the human body is present between the two UWB communication devices 12, the electric wave propagates so as to go around the inclusion. Therefore, the propagation time is a length corresponding to the detour route. That is, the difference between the length of the detour route and the shortest distance appears as the error. In addition, when the wireless signal takes a detour with respect to the shield and propagates, the propagation distance becomes long, so that the reception signal intensity decreases. As the result, as described with reference to FIG. 6, the timing itself at which the reception electric power exceeds the reception determination threshold Th is also delayed.

Therefore, in the comparative configuration, even in a case where each UWB communication device 12 normally operates, when the inclusion is present between the communication devices, the propagation time may deviate from the normal range, depending on the type or the size of the inclusion. Although it is possible to reduce the possibility of erroneous determination due to the diffraction by setting the normal range to be large, for example, it is not possible to detect the failure causing the minute delay such as several nanoseconds. In addition, it is not possible to specify which of the two UWB communication devices 12 constituting the combination in which the propagation time deviates from the normal range is observed has a failure.

On the other hand, in the present embodies, when, in all the combinations related to the diagnosis target device, the propagation time Ta is outside the normal range, it is determined that the failure occurs in the diagnosis target device. In other words, when, in at least one combination among all the combinations related to the diagnosis target device, the propagation time Ta is inside the normal range, it is determined that the diagnosis target device is normal.

Normally, it is unlikely that the shield intervenes between communication devices in all combinations related to the diagnosis target device. According to the communication device diagnosis portion F6 of the present embodiment, it is possible to reduce the possibility of erroneously determining that the UWB communication device 12 having no failure is the failure device due to the presence of the shield (and thus diffraction). In addition, the above-described effect is obtained without setting the normal range to be large. That is, according to the configuration of the present embodiment, it is possible to detect the failure causing the minute delay such as several nanoseconds while reducing the possibility of erroneously determining that the UWB communication device 12 having no failure is the failure device. In addition, it is possible to specify which of the two UWB communication devices 12 constituting the combination in which the propagation time deviates from the normal range is observed has a failure. The diagnosis method described above corresponds to a method that causes each UWB communication device 12 to wirelessly communicate with the different device and determines, based on all the combinations, that the UWB communication device 12 of which distance index value is abnormal is the failure device.

Further, in the present embodiment, each UWB communication device 12 is attached at a position that causes the human body to be difficult to intervene between the communication devices, for example, in the vicinity of a pillar or a ceiling. In such an attachment manner, it is possible to further reduce the influence of the diffraction on the diagnosis accuracy of the UWB communication device 12. Further, the position estimation portion F4 of the present embodiment does not use the distance information observed by the failure device for the position estimation of the portable terminal 2. According to such a configuration, it is possible to reduce the possibility of erroneously determining the terminal position.

In addition, in the present embodiment, the round trip time is measured by transmitting and receiving the single impulse signal. According to the configuration, the response processing time is less likely to be included in the round trip time. As the result, it is possible to improve the estimation accuracy of the distance between the communication devices.

The embodiment of the present disclosure has been described above. The present disclosure should not be limited to the above embodiment, but has a technical scope including various modifications to be described hereinafter and can also be implemented with various changes not described below within a scope not departing from the purpose of the present disclosure. For example, various modifications to be described below can be implemented in appropriate combination within a scope that does not cause technical inconsistency.

Members having a function identical to that of the members described in the above embodiment will be denoted by identical reference signs and will not be described repeatedly. When only a part of the configuration is described, the configuration described in the preceding embodiment can be applied to other parts.

[First Modification]

Figure 13:
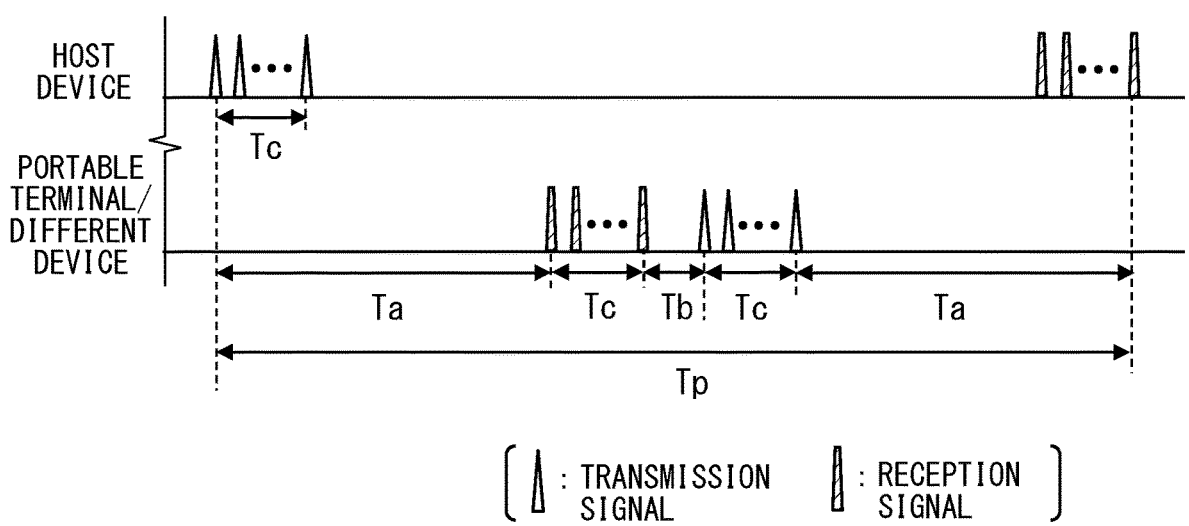
FIG. 13 is a diagram for describing operations of a vehicular electronic key system according to a first modification.

The signal transmitted and received for estimating the propagation time (and thus distance) may not be the single impulse signal but a pulse sequence signal having a constant length as shown in FIG. 13. The pulse sequence signal preferably includes transmission source information and destination information. When the pulse sequence signal includes the transmission source information and the destination information, without limiting the operation of the UWB communication device (hereinafter, non-target device) that is not involved in the communication for estimating the propagation time, it is possible to prevent the non-target device from transmitting the response signal. In the present modification, the propagation time Ta may be calculated from the round trip time Tp by using an assumed value of a length (hereinafter, signal length) Tc of the pulse sequence signal. That is, the propagation time Ta may be calculated as $Ta=(Tp-Tb-Tc\times2)/2$.

[Second Modification]

In the above-described embodiment, each UWB communication device 12 reports the propagation time to the smart ECU 11, and the smart ECU 11 calculates the inter-communication device distance based on the propagation time provided from each UWB communication device 12. However, it is not limited to this. Each UWB communication device 12 may have the function of calculating the inter-communication device distance based on the propagation time. That is, each UWB communication device 12 calculates the distance from the own device to the different device as the communication partner based on the propagation time acquired by a wireless communication with the different device. Then, data indicating the distance is reported to the smart ECU 11 in association with the communication device number for each of the communication partner and the own device. Such a configuration also achieves the same effects as those of the embodiment described above. Further, it is possible to suppress the calculation load of the smart ECU 11.

[Third Modification 3]

Figure 14:
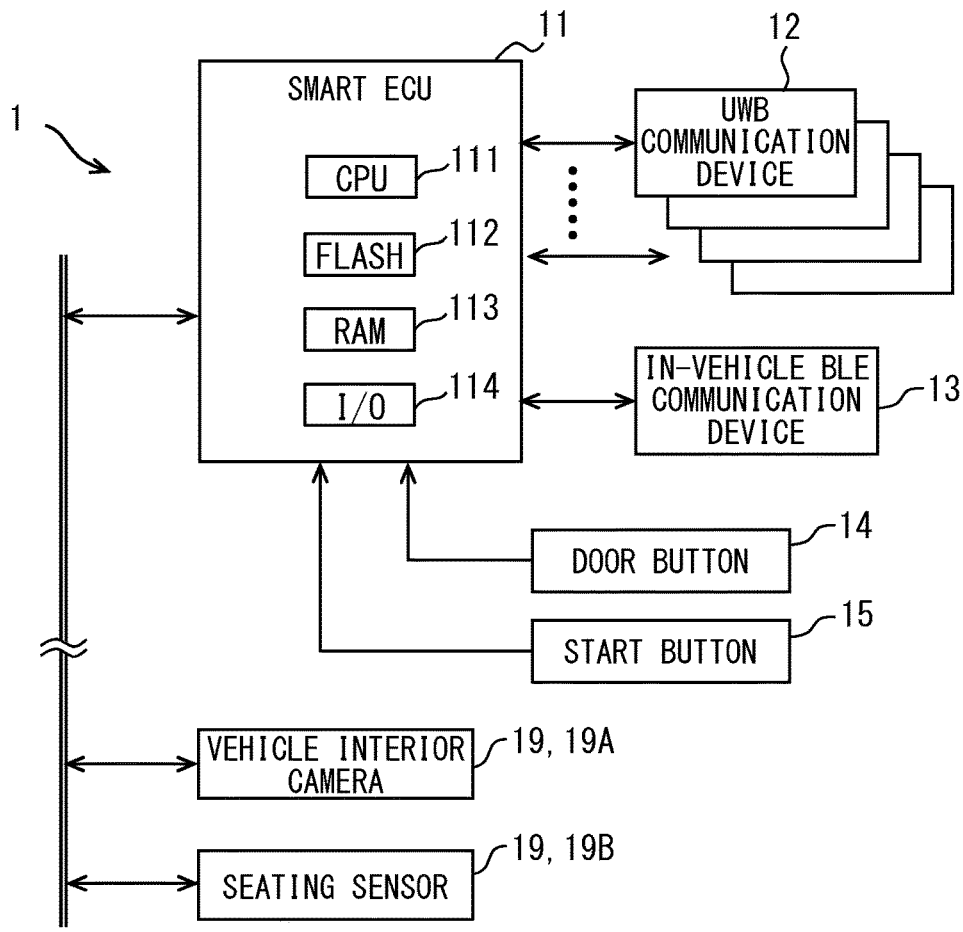
FIG. 14 is a diagram for describing operations of a communication device diagnosis portion according to a third modification.

As shown in FIG. 14, the smart ECU 11 may be connected to an occupant position detection device 19 that outputs data indicating the number of occupants or a seating position. The occupant position detection device 19 is, for example, a vehicle interior camera 19A, a seating sensor 19B, or the like. In a case where the smart ECU 11 is connected to the occupant position detection device 19, when it has been confirmed that the occupant is not inside the vehicle based on the output data of the occupant position detection device 19, the communication device diagnosis portion F6 may execute the diagnosis-related process. According to such configuration, it is possible to reduce the possibility of erroneously determining that the normal UWB communication device 12 is the failure device due to the diffraction by the human body.

The vehicle interior camera 19A is, for example, a camera installed on the upper end of the windshield or the ceiling so as to capture the entire of the vehicle interior. When the smart ECU 11 is directly or indirectly connected to the vehicle interior camera 19A, the smart ECU 11 may specify the presence or the absence of the occupant or the seating position by analyzing a captured image of the vehicle interior camera 19A. The seating sensor 19B detects whether a passenger is seated on the seat of the vehicle Hv (that is, the seated state), and may be installed on, for example, each seat of the vehicle Hv. In addition to the above, as the occupant position detection device 19, a seatbelt sensor that detects a wearing state of the seatbelt or an infrared sensor that covers the vehicle interior as the detection range can be adapted. The communication device diagnosis portion F6 may determine a parked state as a state where no occupant is present in the vehicle interior.

[Fourth Modification]

The communication device diagnosis portion F6 may execute a reference value adjustment process that adjusts a reference value of the normal range in accordance with the actually measured value of the propagation time. For example, the communication device diagnosis portion F6 executes, as the reference value adjustment process, the processes corresponding to S201 to S205, and acquires the propagation time for each combination of communication devices. For example, the actually observed propagation time is used as the reference value, and a range from the reference value to the permissible value is registered as a new normal range. Such a reference value adjustment process corresponds to a process that corrects the normal range for each combination of communication devices. The permissible value that defines the width of the normal range is preferably constant without being changed. Such a configuration corresponds to a configuration that shifts (in other words, offsets) the normal range in accordance with the difference between the default reference value and the actual propagation time. The reference value adjustment process may be executed in the state where the no one is present inside the vehicle, for example, at the time of inspection at a dealer shop or the like. Further, it is preferable that the reference value adjustment process is executed when it has been confirmed that the UWB communication device 12 normally operates by using a dedicated diagnosis tool or executing a predetermined behavior test.

According to the configuration, each UWB communication device 12 can be diagnosed by using the normal range in accordance with the actual environment. In the present modification, it is preferable that reference value update (in other words, normal range update) is not executed when the propagation time observed by the reference value adjustment process significantly deviates from the default reference value (for example, is equal to or higher than a predetermined update prohibition value). This is to reduce the possibility of correcting the normal range by using the propagation time observed in the state where the failure occurs in the UWB communication device 12. The update prohibition threshold may be set to a value about 1 meter in terms of distance, for example, such as 3 nanoseconds.

[Fifth Modification]

Figure 15:
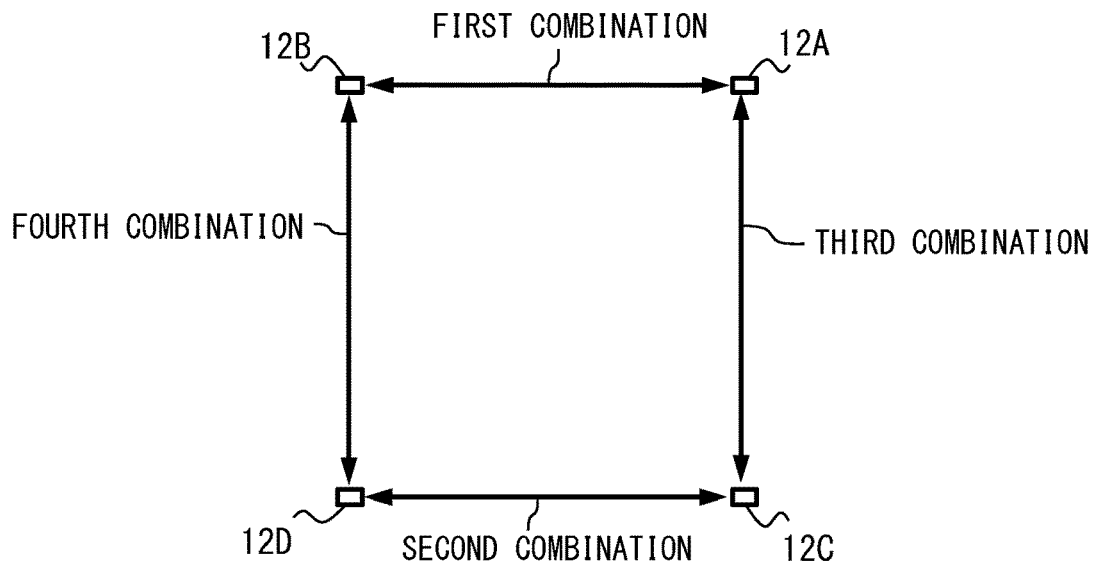
FIG. 15 is a diagram for describing operations of a communication device diagnosis portion according to a fourth modification.

In the above-described embodiment, in the diagnosis-related process, the impulse signal is transmitted and received in both directions and the propagation time is measured, in all combinations having a positional relationship that enables the mutual communication. For example, as shown in FIG. 15, for the fifth combination and the sixth combination, the propagation time may not be measured. Only for the first to fourth combinations, the propagation time may be measured.

Figure 16:
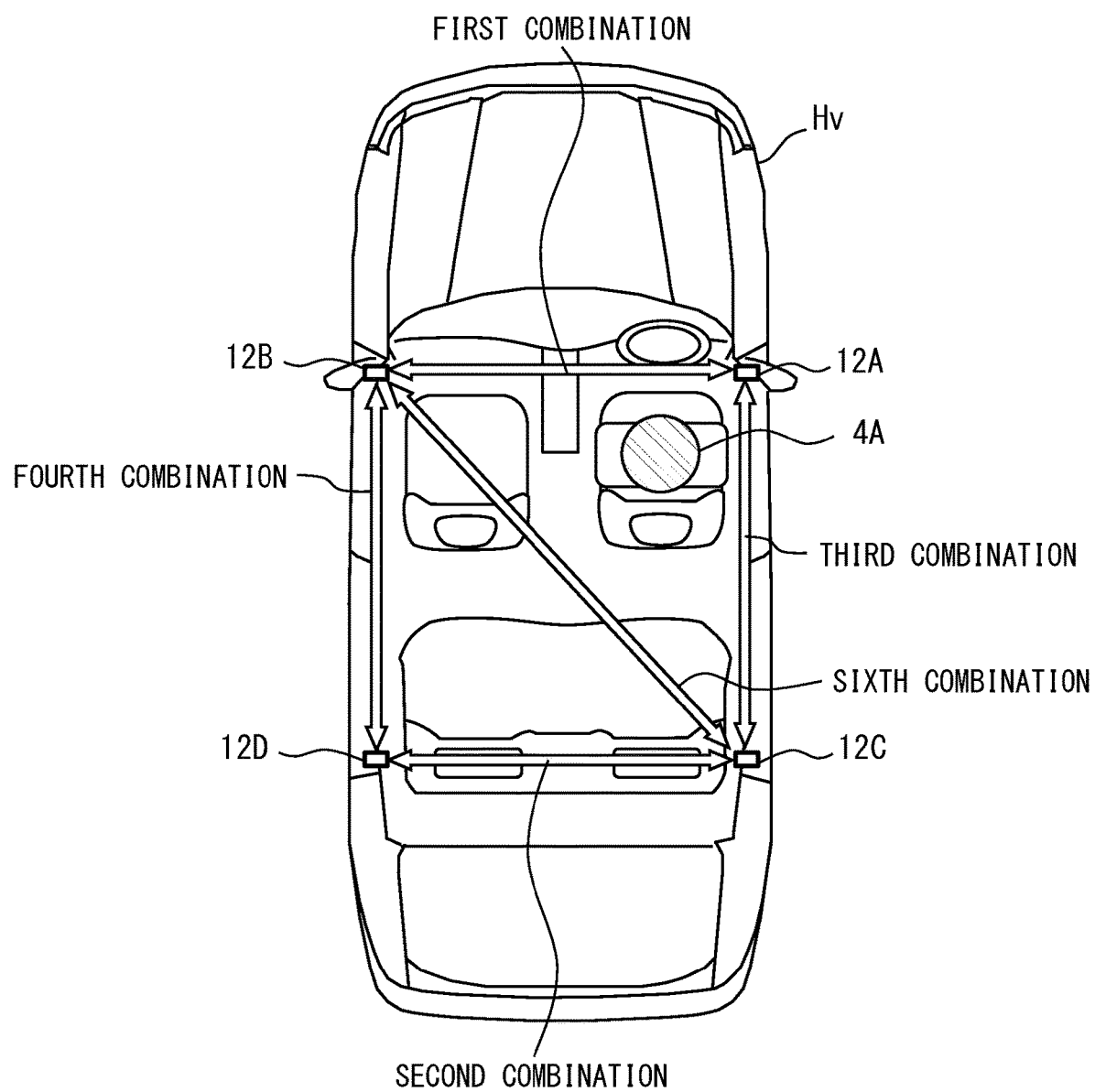
FIG. 16 is a diagram for describing operations of the communication device diagnosis portion according to the fourth modification.

Further, the communication device diagnosis portion F6 may determine whether the failure has occurred by causing the communication devices only for a combination, in which the vehicle interior camera 19A has confirmed that the shield is not interposed between the communication devices, to measure the propagation time. For example, as shown in FIG. 16, when the occupant is seated on the driver seat and a head 4A of the occupant as the shield 4 is present between the right front communication device 12A and the left rear communication device 12D constituting the fifth combination, the propagation time is measured only for combinations other than the fifth combination. According to such a configuration, it is possible to further reduce the possibility of erroneously determining that the normal communication device is the failure device due to the shield.

[Sixth Modification]

The installation aspect (specifically, installation position or the number of installations) of the UWB communication devices 12 is not limited to the above-described aspect. For example, the right front communication device 12A or the left front communication device 12B may be placed in the vicinity of a front wheels or in the vicinity of front wheels, or placed on the side mirror. Further, the right rear communication device 12C or the left rear communication device 12D may be mounted in the vicinity of rear wheels or a rear corner. The vicinity of a certain member is a region from the member to, for example, 30 centimeters.

In addition, as the attachment positions of the UWB communication devices 12, the B-pillar (center pillar), an instrument panel, a center console, an overhead console, a vicinity of a rearview mirror, an upper end of a rear glass, and the like can be adopted. The UWB communication device 12 may be placed in the vicinity (hereinafter, a side surface upper end portion) of a boundary between a side surface portion of the vehicle Hv and a roof portion. Such a configuration corresponds to a configuration in which the UWB communication device 12 is placed at a frame portion located above a side window.

Further, when the body of the vehicle Hv is implemented by using a material (for example, resin) though which the electric waves pass, as the attachment positions of the UWB communication devices 12, an outer door handle for the driver seat and the passenger seat, the vicinity of an inner door handle for the driver seat and the passenger seat, a side sill, and the like can be adopted. The in-vehicle system 1 may include the UWB communication device 12 placed on an outer surface of the vehicle Hv. Here, the outer surface of the vehicle is a portion of the vehicle body which contacts with an outside space of the vehicle Hv. The outer surface of the vehicle includes a side surface, a rear surface, and a front surface of the vehicle Hv. In addition, the in-vehicle system 1 may include the UWB communication device 12 attached inside a trunk, or the UWB communication device 12 attached in the vicinity of a trunk door handle.

Figure 17:
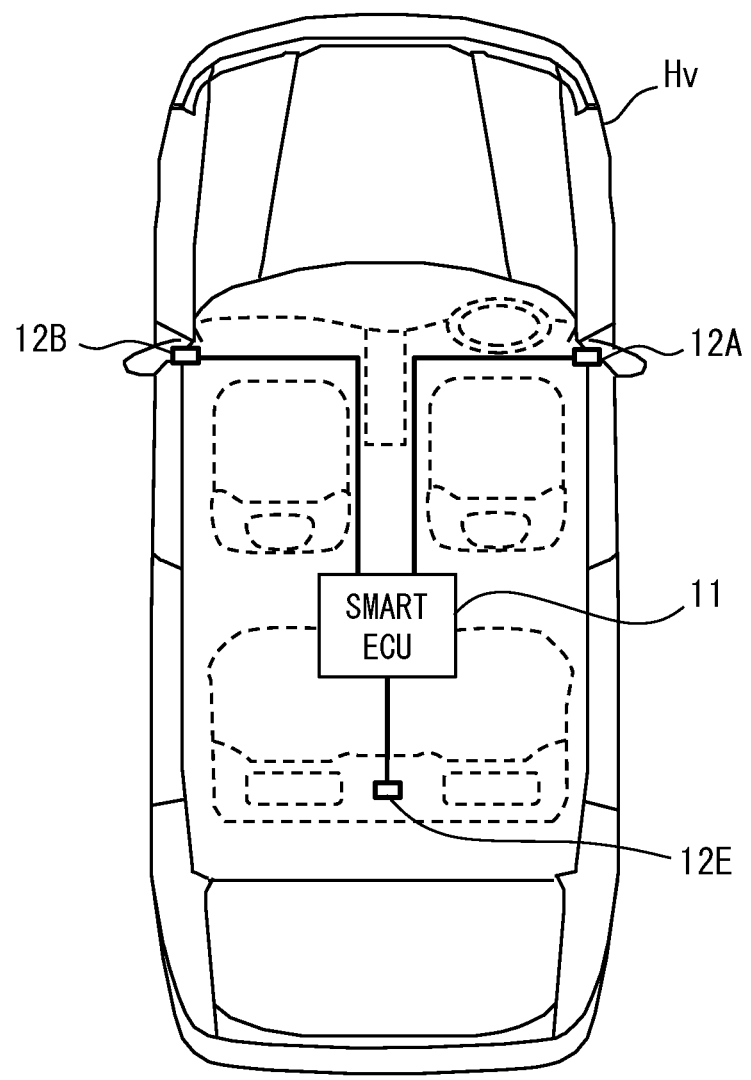
FIG. 17 is a diagram showing a modification of mounting positions of the UWB communication devices and the number of UWB communication devices.

Further, the number of UWB communication devices 12 connected to the smart ECU 11 may be three, five, six, or more. For example, as shown in FIG. 17, the smart ECU 11 may be connected to three UWB communication devices 12 of the right front communication device 12A, the left front communication device 12B, and a rear center communication device 12E. The rear center communication device 12E is, for example, a UWB communication device 12 attached to a center portion, in a vehicle width direction, of a ceiling located above a rear seat. The smart ECU 11 can estimate the terminal position when being connected to at least three normal UWB communication devices 12.

[Seventh Modification]

In the above-described embodiment, as the distance index value, the propagation time for one way is used. However, as the distance index value, the round trip time Tp may be used. In the above-described embodiment, the propagation time is calculated from the round trip time Tp. However, it is not limited to this. For example, in a case where each UWB communication device 12 is completely synchronized under the control of the smart ECU 11, each UWB communication device 12 may calculate the propagation time based on the difference between a time when the difference device transmits the signal and a time when the signal is actually received. The propagation time can be calculated by, for example, predefining a time point when each UWB communication device 12 transmits the signal.

Further, the distance index value may be a distance value obtained by multiplying the propagation time by the speed of light. When the distance itself is adopted as the distance index value, the normal range may be defined by the distance instead of the propagation time.

[Eighth Modification]

In the above-described embodiment, the in-vehicle system 1 and the portable terminal 2 acquire the distance index value between the communication devices by using the impulse signal of the UWB communication. However, it is not limited to this. For example, the in-vehicle system 1 and the portable terminal 2 may acquire the distance index value between communication devices by using a wireless signal compliant with a short distance wireless communication standard such as Bluetooth, Wi-Fi, or ZigBee. It is preferable that the in-vehicle system 1 and the portable terminal 2 acquire the distance index value between the communication devices by using a wireless signal of 1 GHz or more.

The controller and the method thereof described in the present disclosure are implemented by a dedicated computer provided by configuring a processor and a memory programmed to execute one or more functions embodied by a computer program. Alternatively, the controller and the method described in the present disclosure may be implemented by a dedicated computer provided by configuring a processor with one or more dedicated hardware logic circuits. Alternatively, the controller and the method thereof described in the present disclosure are based on a combination of a processor and a memory programmed to execute one or more functions and a processor configured by one or more hardware logic circuits. It may be implemented by one or more configured dedicated computers. The computer programs may be stored, as instructions to be executed by a computer, in a tangible non-transitory computer-readable storage medium.

Here, the controller is, for example, the smart ECU 11. Further, the portable terminal controller 23 may be also included in the above-described controller. The methods or functions provided by the smart ECU 11 may be provided by software stored in a tangible memory device and a computer executing the software, only software, only hardware, or a combination of the software and the hardware. Some or all of the functions of the smart ECU 11 may be configured as hardware. A configuration in which a certain function is implemented as hardware includes a configuration in which the function is implemented by using one or more ICs or the like. In the above-described embodiment, the smart ECU 11 is implemented by using the CPU. However, the configuration of the smart ECU 11 is not limited to this. The smart ECU 11 may be implemented by using a MPU (Micro Processor Unit), a GPU (Graphics Processing Unit), or a DFP (Data Flow Processor), instead of the CPU 111. Further, the smart ECU 11 may be implemented by a combination of various processors such as the CPU 111, the MPU, the GPU, and the DFP. Further, for example, some of the functions to be provided by the smart ECU 11 may be implemented by using a FPGA (Field-Programmable Gate Array), an ASIC (Application Specific Integrated Circuit), or the like. The similar applies to the portable terminal controller 23.

Here, it is noted that a flowchart or the process of the flowchart in the present disclosure includes multiple steps (also referred to as sections), each of which is represented, for instance, as S101. Further, each step can be divided into several sub-steps while several steps can be combined into a single step.

In the above, the embodiment, the configuration, and the aspect of the vehicle position estimation system according to the present disclosure are exemplified. However, the present disclosure is not limited to every embodiment, every configuration and every aspect related to the present disclosure that are exemplified. For example, embodiments, configurations, and examples obtained from an appropriate combination of technical elements disclosed in different embodiments, configurations, and examples are also included within the scope of the embodiments, configurations, and examples of the present disclosure.

The invention claimed is:

1. A vehicular position estimation system configured to determine a portable terminal position with respect to a vehicle by causing a plurality of in-vehicle communication devices placed at different positions on the vehicle to wirelessly communicate with a portable terminal carried by a user of the vehicle, each of the plurality of in-vehicle communication devices being configured to wirelessly communicate with at least two of a plurality of different devices that are mounted on the vehicle and are the plurality of in-vehicle communication devices, the vehicular position estimation system comprising:

a distance index value acquisition portion configured to acquire a distance index value directly or indirectly indicating a distance between the plurality of in-vehicle communication devices by causing the plurality of in-vehicle communication devices to perform a wireless communication for each combination of the plurality of in-vehicle communication devices having a positional relationship that enables the wireless communication with each other;

a normal range storage portion configured to store data indicating a normal range of the distance index value in accordance with a combination of the plurality of in-vehicle communication devices; and a communication device diagnosis portion configured to (i) determine whether the plurality of in-vehicle communication devices are in a normal state based on the distance index value for each combination, which is acquired by the distance index value acquisition portion, of the plurality of in-vehicle communication devices, (ii) adjust the normal range of the distance index value in a state where an occupant is not present inside the vehicle, and (iii) adjust a default reference value of the normal range in response to the default reference value of the normal range deviating from a propagation time observed by at least one of the plurality of in-vehicle communication devices by at least a predetermined value, wherein when the distance index value between a diagnosis target device to be diagnosed among the plurality of in-vehicle communication devices and at least one of the plurality of different devices is within the normal range in accordance with the combination of the plurality of in-vehicle communication devices, the communication device diagnosis portion determines that a failure does not occur in the diagnosis target device;

the vehicular position estimation system further comprising a vehicle controller configured to perform control of the vehicle based on a determination result of the portable terminal position using the diagnosis target device that has been determined not to have the failure, the control of the vehicle including at least one of locking or unlocking a door of the vehicle or starting an engine of the vehicle;

wherein:

when each distance index value between the diagnosis target device and each of the plurality of different devices configured to communicate with the diagnosis target device is outside the normal range, the communication device diagnosis portion determines that the failure occurs in the diagnosis target device; and each of the plurality of in-vehicle communication devices is attached at a position where signals from the plurality of different devices are directly received in the state where the occupant is not present inside the vehicle.

2. The vehicular position estimation system according to claim 1, wherein:

a width from an upper limit value of the normal range to a lower limit value of the normal range is set to be smaller than a value corresponding to two meters.

3. The vehicular position estimation system according to claim 1, wherein:

when the occupant is not present inside the vehicle, the communication device diagnosis portion causes the plurality of in-vehicle communication devices to perform the wireless communication for acquiring the distance index value.

4. The vehicular position estimation system according to claim 3, wherein:

when the vehicle is parked, the communication device diagnosis portion causes the plurality of in-vehicle communication devices to perform the wireless communication for acquiring the distance index value.

5. The vehicular position estimation system according to claim 3, further comprising:

an occupant position detection device configured to detect a position where the occupant is seated inside the vehicle, wherein:

based on a detection result of the occupant position detection device, for the combination of the plurality of in-vehicle communication devices having a positional relationship in which a wireless signal is diffracted by the occupant and propagates, the wireless communication for acquiring the distance index value is not performed.

6. The vehicular position estimation system according to claim 1, wherein:

each of the plurality of in-vehicle communication devices is attached to a pillar or a ceiling.

7. The vehicular position estimation system according to claim 1, wherein:

the communication device diagnosis portion is configured to acquire the distance index value for each combination of the plurality of in-vehicle communication devices by causing the plurality of in-vehicle communication devices to perform the wireless communication for each combination of the plurality of in-vehicle communication devices in a state where the occupant is not present inside the vehicle, and correct the normal range for each combination, which is stored in the normal range storage portion, of the plurality of in-vehicle communication devices, based on an acquired distance index value.

8. The vehicular position estimation system according to claim 1, wherein:

each of the plurality of in-vehicle communication devices is configured to specify a propagation time of an impulse signal of an ultra wide bandwidth between the plurality of in-vehicle communication devices by transmitting the impulse signal to the plurality of different devices and receiving the impulse signal from the plurality of different devices, and provide a specified propagation time to the communication device diagnosis portion.

9. A vehicular position estimation system configured to determine a portable terminal position with respect to a vehicle by causing a plurality of in-vehicle communication devices placed at different positions on the vehicle to wirelessly communicate with a portable terminal carried by a user of the vehicle, the vehicular position estimation system comprising:

each of the plurality of in-vehicle communication devices that includes one or more first processors; and a first memory coupled to the one or more first processors and storing program instructions that when executed by the one or more first processors cause the one or more first processors to at least:

wirelessly communicate with at least two of a plurality of different devices that are mounted on the vehicle and are the plurality of in-vehicle communication devices;

one or more second processors; and a second memory coupled to the one or more second processors and storing program instructions that when executed by the one or more second processors cause the one or more second processors to at least:

acquire a distance index value directly or indirectly indicating a distance between the plurality of in-vehicle communication devices by causing the plurality of in-vehicle communication devices to perform a wireless communication for each combination of the plurality of in-vehicle communication devices having a positional relationship that enables the wireless communication with each other;

store data indicating a normal range of the distance index value in accordance with a combination of the plurality of in-vehicle communication devices;

determine whether the plurality of in-vehicle communication devices are in a normal state based on the acquired distance index value for each combination of the plurality of in-vehicle communication devices;

adjust the normal range of the distance index value in a state where an occupant is not present inside the vehicle;

adjust a default reference value of the normal range in response to the default reference value of the normal range deviating from a propagation time observed by at least one of the plurality of in-vehicle communication devices by at least a predetermined value; and when the distance index value between a diagnosis target device to be diagnosed among the plurality of in-vehicle communication devices and at least one of the plurality of different devices is within the normal range in accordance with the combination of the plurality of in-vehicle communication devices, determine that a failure does not occur in the diagnosis target device;

wherein:

the one or more first processors or the one or more second processors are further caused to perform control of the vehicle based on a determination result of the portable terminal position using the diagnosis target device that has been determined not to have the failure, the control of the vehicle including at least one of locking or unlocking a door of the vehicle or starting an engine of the vehicle;

when each distance index value between the diagnosis target device and each of the plurality of different devices configured to communicate with the diagnosis target device is outside the normal range, the program instructions further cause the one or more second processors to determine that the failure occurs in the diagnosis target device; and each of the plurality of in-vehicle communication devices is attached at a position where signals from the plurality of different devices are directly received in the state where the occupant is not present inside the vehicle.

\* \* \* \* \*